United States Patent
Lee et al.

(10) Patent No.: US 9,521,589 B2
(45) Date of Patent: Dec. 13, 2016

(54) WI-FI DIRECT SERVICE METHOD USING NFC AND DEVICE THEREFOR

(71) Applicant: LG ELECTRONICS INC., Seoul (KR)

(72) Inventors: Byungjoo Lee, Anyang-si (KR); Wookbong Lee, Anyang-si (KR); Dongcheol Kim, Anyang-si (KR); Hangyu Cho, Anyang-si (KR); Jinho Kim, Anyang-si (KR); Suhwook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/439,211

(22) PCT Filed: Oct. 29, 2013

(86) PCT No.: PCT/KR2013/009669
§ 371 (c)(1),
(2) Date: Apr. 28, 2015

(87) PCT Pub. No.: WO2014/069868
PCT Pub. Date: May 8, 2014

(65) Prior Publication Data
US 2015/0296416 A1    Oct. 15, 2015

Related U.S. Application Data

(60) Provisional application No. 61/719,930, filed on Oct. 29, 2012, provisional application No. 61/749,916, (Continued)

(51) Int. Cl.
*H04W 36/00* (2009.01)
*H04W 8/00* (2009.01)
(Continued)

(52) U.S. Cl.
CPC ....... *H04W 36/0005* (2013.01); *H04B 5/0031* (2013.01); *H04W 8/005* (2013.01); (Continued)

(58) Field of Classification Search
CPC . H04B 5/0031; H04W 36/0005; H04W 76/02; H04W 76/023; H04W 84/12; H04W 8/005; H04W 92/18
(Continued)

(56) References Cited

U.S. PATENT DOCUMENTS 6,289,451 B1 * 9/2001 Dice .................. H04L 9/3236
713/168
2002/0085516 A1 * 7/2002 Bridgelall ............. H04W 36/04
370/329
(Continued)

FOREIGN PATENT DOCUMENTS

KR   10-2012-0022156    3/2012
KR      2012/087078    6/2012
(Continued)

OTHER PUBLICATIONS

PCT International Application No. PCT/KR2013/009669, Written Opinion of the International Searching Authority dated Feb. 21, 2014, 18 pages.
(Continued)

*Primary Examiner* — Stephen J Clawson
(74) *Attorney, Agent, or Firm* — Lee, Hong, DeGerman, Kang & Waimey

(57) ABSTRACT

The present invention relates to a wireless communication system and more particularly, to a method for performing connection setting for Wi-Fi direct services communication and a device therefor, the method comprising a step of performing device discovery between two devices through an NFC touch.

5 Claims, 18 Drawing Sheets

Related U.S. Application Data filed on Jan. 8, 2013, provisional application No. 61/888,497, filed on Oct. 8, 2013.

(51) Int. Cl.
| | | |
|---|---|---|
| *H04W 76/02* | (2009.01) | |
| *H04B 5/00* | (2006.01) | |
| *H04W 92/18* | (2009.01) | |
| *H04W 84/12* | (2009.01) | |

(52) U.S. Cl.
CPC ......... *H04W 76/02* (2013.01); *H04W 76/023* (2013.01); *H04W 84/12* (2013.01); *H04W 92/18* (2013.01)

(58) Field of Classification Search
USPC .......................................................... 370/331
See application file for complete search history.

(56) References Cited

U.S. PATENT DOCUMENTS

| | | | | |
|---|---|---|---|---|
| 2006/0239236 | A1* | 10/2006 | Otsuka .................. | H04W 28/18 370/338 |
| 2007/0115847 | A1* | 5/2007 | Strutt .................. | H04L 12/2602 370/252 |
| 2010/0017570 | A1* | 1/2010 | Gallo .................. | G06K 7/10237 711/154 |
| 2011/0275316 | A1* | 11/2011 | Suumaki ............ | G06K 7/10237 455/41.1 |
| 2012/0099566 | A1 | 4/2012 | Laine et al. | |
| 2013/0057913 | A1* | 3/2013 | Park ...................... | G06F 21/608 358/1.15 |
| 2013/0346553 | A1* | 12/2013 | Shin .................... | H04W 76/043 709/217 |

FOREIGN PATENT DOCUMENTS

| | | |
|---|---|---|
| KR | 10-2012-0092366 | 8/2012 |
| KR | 10-2012-0095572 | 8/2012 |
| KR | 2012/144707 | 10/2012 |

OTHER PUBLICATIONS

European Patent Office Application No. 13852057.2, Search Report dated Apr. 12, 2016, 6 pages.
"Connection Handover Technical Specification NFC Forum Connection Handover 1.2", Jul. 7, 2010, 27 pages.

\* cited by examiner

FIG. 11
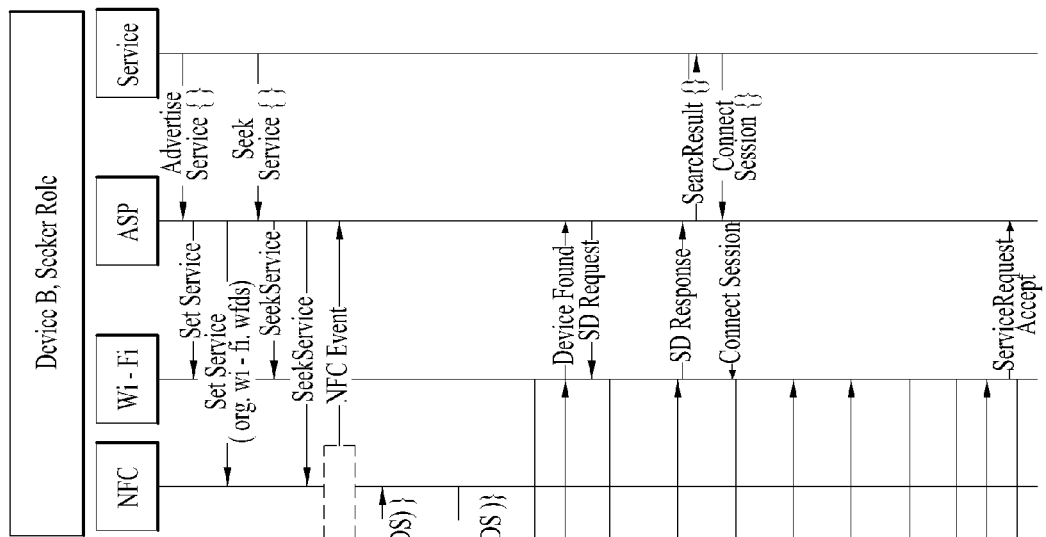
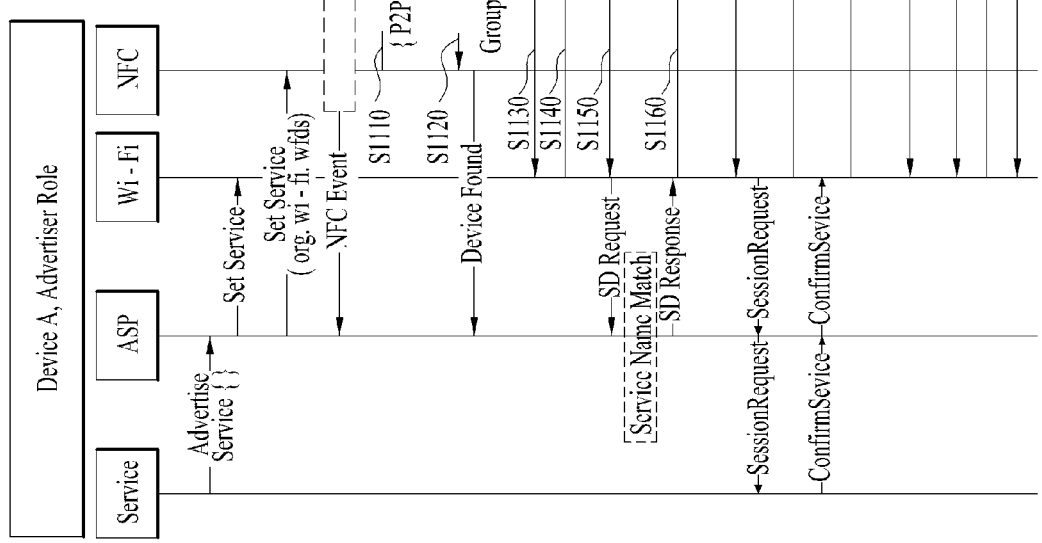

FIG. 12
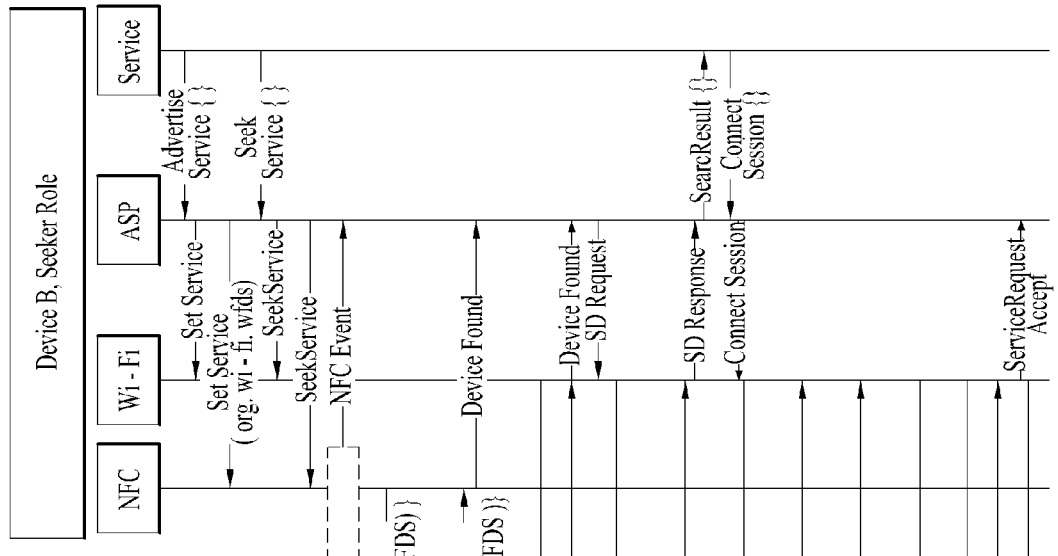
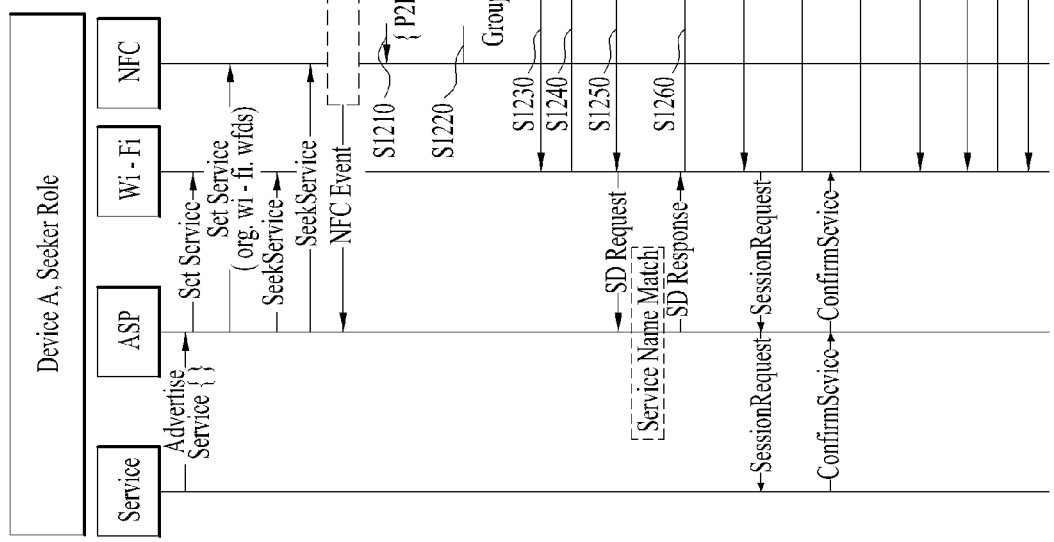

Handover Select Record

WI-FI DIRECT SERVICE METHOD USING NFC AND DEVICE THEREFOR

CROSS-REFERENCE TO RELATED APPLICATIONS

This application is the National Stage filing under 35 U.S.C. 371 of International Application No. PCT/KR2013/009669, filed on Oct. 29, 2013, which claims the benefit of U.S. Provisional Application No. 61/719,930, filed on Oct. 29, 2012, 61/749,916, filed on Jan. 8, 2013 and 61/888,497, filed on Oct. 8, 2013, the contents of which are all hereby incorporated by reference herein in their entirety.

TECHNICAL FIELD

This disclosure relates to a wireless communication system, and more particularly, to a method for Wi-Fi Direct Services (WFDS) communication using NFC technology and a device therefor. More specifically, the present invention relates to a method for connection establishment through NFC touch and a device therefor.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Standards for Wireless Local Area Network (LAN) technology are being developed by the Institute of Electrical and Electronics Engineers (IEEE) 802.11 group. IEEE 802.11a and 802.11b use an unlicensed band at 2.4 or 5 GHz. IEEE 802.11b provides a transfer rate of 11 Mbps, while IEEE 802.11a provides a transfer rate of 54 Mbps. IEEE 802.11g applies Orthogonal Frequency Division Multiplexing (OFDM) at 2.4 GHz to provide a transfer rate of 54 Mbps. IEEE 802.11n applies Multiple Input Multiple Output-OFDM (MIMO-OFDM) to provide a data rate of 300 Mbps. IEEE 802.11n supports channel bandwidths up to 40 MHz. In this case, IEEE 802.11n provides a transfer rate of 600 Mbps. IEEE 802.11p is a standard for supporting Wireless Access in Vehicular Environments (WAVE). For example, IEEE 802.11p provides improvements needed to support Intelligent Transportation Systems (ITS). IEEE 802.11ai is a standard for supporting fast initial link setup for IEEE 802.11 stations (STAs).

A protocol related to Direct Link Setup (DLS) in a WLAN environment conforming to IEEE 802.11e presupposes a Basic Service Set (BSS) supporting Quality of Service (QoS), namely a Quality BSS (QBSS). In the QBSS, not only a non-access point (AP) STA but also an AP serves as Quality APs (QAPs) supporting QoS. In currently commercialized WLAN environments (e.g., WLAN environments conforming to IEEE 802.11a/b/g), most APs are legacy APs that do not support QoS even if non-AP STAs are Quality STAs (QSTAs) supporting QoS. As a result, currently commercialized WLAN environments are limited in that the DLS service is not available even to QSTAs.

With recent widespread application of short-range wireless communication technology such as Wi-Fi, devices are not only connected to each other over a local network but also directly connected to each other. One device-to-device direction connection technology based on Wi-Fi is Wi-Fi Direct.

Wi-Fi Direct is a network connectivity standard describing operation of a link layer. Since a rule or standard for applications is not defined on a higher layer, incompatibility and inconsistent operation occur in executing an application after connection between Wi-Fi Direct devices is established. To address this problem, a standard specification called Wi-Fi Direct Services (WFDS) that contains upper-layer applications is under development by the Wi-Fi Alliance (WFA).

WFA has announced a new standard for delivering data through direction connection between mobile devices, namely Wi-Fi Direct. Thereby, relevant industries are briskly developing technologies to satisfy the Wi-Fi Direct standard. In a strict sense, Wi-Fi Direct is a marketing term corresponding to a brand name. Technical standards for Wi-Fi Direct are collectively called Wi-Fi Peer-to-Peer (P2P). Accordingly, Wi-Fi Direct and Wi-Fi P2P may be used interchangeably in the present invention in discussing the Wi-Fi-based P2P technology. For a legacy Wi-Fi network, a typical Wi-Fi-embedded device accesses an Internet network by performing access via an AP. A method for data communication through direct device-to-device connection has been conventionally used by some users by being embedded in devices such as cell phones and notebook PCs equipped with wireless communication technology such as Bluetooth. However, this method provides low transfer rate and transmission coverage for actual use thereof is limited to 10 m. In particular, the method has a technical limit on perceived performance in an environment in which a large volume of data is transmitted or many Bluetooth devices are present.

Meanwhile, Wi-Fi P2P has added sections for supporting direct communication between devices while retaining most functions of the legacy Wi-Fi standard. Thereby, Wi-Fi P2P provides P2P communication between devices by sufficiently utilizing hardware and physical properties of Wi-Fi chip-embedded devices and simply upgrading software alone in most cases.

As is well known, Wi-Fi chips have increasingly been applied to devices from various fields including notebook PCs, smartphones, smart TVs, game consoles and cameras, and a sufficient number of suppliers and technology manpower have been created. However, software development for supporting the Wi-Fi P2P standard has not been activated yet. This is because relevant software that will allow convenient utilization of the Wi-Fi P2P standard has not been distributed since the standard was announced.

A P2P group includes a device acting as an AP on the existing infrastructure network. This device is referred to as the P2P Group Owner (GO) in the P2P standard. There may be various P2P Clients around the P2P GO. In a P2P group, only one device can serve as the P2P GO and the other devices act as client devices.

FIG. 1 shows typical P2P network topology.

As shown in FIG. 1, the P2P GO may be directly connected to a client having a P2P function or may be connected to a legacy client having no P2P function.

FIG. 2 illustrates a situation in which one P2P device forms a P2P group and at the same time acts as an STA of WLAN to connect to an AP.

As shown in FIG. 2, the P2P technology standard defines the illustrated operation mode of P2P devices as concurrent operation.

In order for a series of P2P devices to form a group, which of the devices is to be the P2P GO is determined by the values of Group Owner Intent of P2P Attribute ID. The values are set between 0 and 15. The P2P devices exchange these values and a device having the greatest value becomes the P2P GO. A legacy device that does not support Wi-Fi P2P technology may also belong to the P2P group. In this case, the role of the legacy device is limited to the function of access to an infrastructure network via the P2P GO.

According to the Wi-Fi P2P standard, the P2P GO transmits a beacon signal using Orthogonal Frequency Division Multiplexing (OFDM), and therefore the 11b standard is not supported, while 11a/g/n standard devices may be used as Wi-Fi P2P devices.

To ensure the operation of establishing connection between the P2P GO and P2P clients, the P2P standard includes the following four functions.

First, P2P Discovery deals with technical items such as device discovery, service discovery, group formation and P2P invitation. In device discovery, two P2P devices exchange device-related information such as device names or device types thereof with each other over the same channel. In service discovery, the devices exchange information related to a service for the devices to use through P2P. Group formation functions to determine which device is to be the P2P GO and to create a new group. P2P invitation functions to call a permanently formed P2P group or to cause a P2P device to participate in an existing P2P group.

Secondly, P2P Group Operation describes formation and completion of a P2P group, confection to the P2P group, communications in the P2P group, a service for P2P client discovery, operation of a persistent P2P group, and the like.

Thirdly, P2P Power Management describes a method for P2P device power management and a method for signal processing at the time a power saving mode begins.

Lastly, Managed P2P Device describes a method for one P2P device to form a P2P group and access an infrastructure network via a WLAN AP at the same time.

Hereinafter, properties of the P2P group will be described. The P2P group is similar to the legacy infrastructure Basic Service Set (BSS) in that the P2P GO serves as an AP and P2P clients serve as STAs. Accordingly, a P2P device needs to be equipped with software serving as the GO and client. P2P devices are distinguished from each other by using P2P device addresses such as MAC addresses. P2P devices perform communication in the P2P group using P2P interface addresses. In this case, the P2P devices need not use a globally unique ID address. The P2P group has a globally unique ID P2P group ID, which is configured by a combination of a Service Set Identifier (SSID) and a P2P device address of the P2P GO. The Wi-Fi P2P standard uses WPA2-PSK/AES for security. The life cycle of the P2P group includes a temporary connection mechanism and a persistent connection mechanism in which the same connection is attempted after a certain period of time. Persistent group corresponds to a method to enable quick reconnection of a P2P group by applying the same connection type with roles, certification, SSIDs, and P2P group ID of the devices cashed when the P2P group was formed.

Hereinafter, a method for Wi-Fi P2P connection will be described. Wi-Fi devices proceed through a two-phase connection procedure. The first phase is discovery in which two P2P devices discover (find) each other. The second phase is group formation in which the role of P2P GO or P2P client is determined between the discovered devices. The discovery phase allows P2P devices to be connected to each other. Specifically, the discovery phase consists of a search state and a listen state. In the search state, the devices perform active scanning using a Probe Request frame. To perform fast scanning, the scanning range is defined. Scanning is performed using social channels, namely channels 1, 6 and 11. A P2P device selects one of the three social channels and remains in the listen state. If the P2P device receives a Probe Request frame transmitted from another P2P device which is in the search state, it responds with a Probe Response frame. The P2P devices may continuously alternate between the search state and the listen state and reach a common channel. After the P2P devices discover each other, they use the Probe Request frame and the Probe Response frame to discover a device type, a manufacturer, or a familiar device name in order to be optionally associated with each other. In addition, to check an inter-device compatible service present in the P2P devices, service discovery may be employed. This is intended to determine whether a service provided in one device is compatible with another device. In the P2P standard, a specific service discovery standard is not defined. A P2P device user may search for proximate P2P devices and services provided by the devices and then quickly connect to a desired device or service.

Hereinafter, group formation, which is the second phase, will be described. When the P2P devices complete the discovery (find) phase described above, checking presence of the counterpart device is completed. The two P2P devices need to enter the GO negotiation phase for configuring a BSS based on the discovery phase. The negotiation phase is broadly divided into two sub-phases. One sub-phase is a GO negotiation phase, and the other sub-phase is a Wi-Fi Protected Setup (WPS) phase. In the GO negotiation phase, the devices negotiate for the role of P2P GO or P2P client and set an operating channel to be used in the P2P group. In the WPS phase, operation that is usually performed in the conventional WPS is performed. The operation includes exchange of PIN information input by a user of the device through, for example, a keypad and simple setup through a push button. In the P2P group, P2P GO plays a key role. P2P GO assigns a P2P interface address, selects an operation channel for the group, and sends a beacon signal containing various operation parameters. In the P2P group, only P2P GO is capable of transmitting the beacon signal. Using the beacon signal, the P2P devices quickly recognize P2P GO and participate in the group in the scan phase, which is an initial phase of connection. Alternatively, the P2P GO may initiate a P2P group session on its own. The P2P GO may initiate the P2P group session after using the method described above in the P2P discovery phase. The value for P2P GO playing such an important role is not a fixed value for a certain device, but is adjustable by an application or higher-layer service. Therefore, the developer may select a proper value for P2P GO according to the purpose of an application.

Next, P2P addressing will be described. A P2P device assigns a P2P interface address to be used, using a MAC address in the P2P group session. Herein, the P2P interface address of P2P GO is a BSS Identifier (BSSID), which is substantially the MAC address of P2P GO.

Hereinafter, disassociation of the P2P group will be described. If the P2P session ends, the P2P GO needs to inform all P2P clients of end of the P2P group session through deauthentication. The P2P clients may also perform disassociation for P2P GO. In this case, the clients need to go through a disassociation procedure, if possible. Upon receiving a disassociation request from a P2P client, the P2P GO may recognize that the P2P client has been disassociated. If the P2P GO senses an abnormal protocol error from a P2P client or a P2P client disturbing connection of the P2P group, it triggers rejection of authentication or denial of association. In this case, the P2P GO records a specific reason of failure in an association response and then transmits the response.

DISCLOSURE

Technical Problem

An object of the present invention is to provide a method for efficiently performing a Wi-Fi Direct Services (WFDS) connection procedure in a wireless communication system and a device therefor. Another object of the present invention is to provide a method for efficiently performing a connection procedure using an NFC scheme and a device therefor.

Another object of the present invention is to provide a method for efficiently configuring a connection request message and a connection response message in establishing Wi-Fi Direct service connection using the NFC scheme and a device therefor.

Another object of the present invention is to provide a method for efficiently configuring a procedure of searching for a specific service using the NFC scheme in establishing the Wi-Fi Direct service connection and implementing the service.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The object of the present invention can be achieved by providing a method for establishing Wi-Fi Direct Services (WFDS) communication, including transmitting, by a first device, a handover request message to a second device via a Near Field Communication (NFC) channel, and receiving, by the first device, a handover select message from the second device via the NFC channel, wherein the handover request message contains service hash information indicating WFDS supportable by the first device.

Preferably, when the second device supports WFDS, the handover select message may contain service name information on the WFDS to be used by the second device.

Preferably, the handover select message may contain configuration information allowing a target device to be discovered via a listen channel, the listen channel being used for WFDS connection.

Preferably, when NFC connection configuration information is stored between the first device and the second device, connection configuration between the two devices may be established with the same configuration information.

Preferably, the handover request message may be configured in a NFC Data Exchange Format (NDEF) containing the service hash information.

Preferably, the handover request message may further contain an NFC Data Exchange Format (NDEF) record containing information for second layer connection between the two devices.

Preferably, the handover select message may be configured in an NDEF containing the service hash information.

Preferably, the handover select message may further contain an NDEF record containing information for second layer connection between the two devices.

Preferably, the NDEF record may include a payload part indicating WFDS information in a format of Type-Length-Value (TLV).

Preferably, information on the WFDS supportable by the first device may be acquired by an NFC module of the first device through advertisement of an Application Service Platform (ASP) of the first device.

Preferably, the method may further include transmitting, by one of the first device and the second device having priority over the other device, a Peer to Peer (P2P) service discovery request message to the other device, and receiving a P2P service discovery response message from the other device receiving the P2P service discovery request message, the P2P service discovery response message being a response to the P2P service discovery request message.

Preferably, the priority may be determined based on at least one of an existing WFDS connection state of each of the devices, a performance of each of the devices, and a type of WFDS.

Preferably, transmitting the handover request message of the first device and the second device may be initiated by a touch or proximity touch of NFC modules of the two devices.

Preferably, the WFDS may include at least one of send, play, print, display, neighborhood Area Network (NAN), Wi-Fi Serial Bus (WSB) and docking.

Preferably, the handover may be one of a negotiation handover and a static handover.

In another aspect of the present invention, provided herein is a method for establishing Wi-Fi Direct Services (WFDS) communication, including receiving, by a first device, a handover request message from a second device via a Near Field Communication (NFC) channel, and transmitting, by the first device, a handover select message to the second device via the NFC channel, wherein the handover request message contains service hash information indicating WFDS supportable by the second device.

In another aspect of the present invention, provided herein is a device for establishing Wi-Fi Direct Services (WFDS) communication, including a processor, and a transceiver, wherein the transceiver is configured to transmit a handover request message from a first device to a second device via a Near Field Communication (NFC) channel and to receive a handover select message from the second device via the NFC channel, wherein the handover request message contains service hash information indicating WFDS supportable by the first device.

In another aspect of the present invention, provided herein is a method for establishing Wi-Fi Direct Services (WFDS) communication, including receiving, by the first device, a handover select message from a second device via a Near Field Communication (NFC) channel after an NFC touch occurs, wherein the handover select message contains service hash information indicating WFDS supportable by the second device.

Advantageous Effects

According to embodiments of the present invention, Wi-Fi Direct Services communication may be efficiently performed in a wireless communication system. Specifically, initial connection setup for Wi-Fi Direct Services communications may be efficiently performed.

According to embodiments of the present invention, communication overhead caused by the Wi-Fi Direct Services connection phase may be reduced using NFC.

According to embodiments of the present invention, Wi-Fi Direct connection is attempted by pre-selecting a specific service of Wi-Fi Direct Services through NFC. Once the connection is successful, the service is immediately implemented. Thereby, the procedure of device selection and service selection by the user may be simplified.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 11 is a diagram illustrating another example of the WFDS connection procedure with NFC handover employed in the present invention, in which one device serves as a seeker.

FIG. 12 is a diagram illustrating another example of the WFDS connection procedure with NFC handover employed in the present invention, in which both devices serve as seekers.

BEST MODE

The embodiments of the present invention described below can be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and orthogonal frequency division multiplexing (OFDM). CDMA may be embodied through radio technologies such as universal terrestrial radio access (UTRA) or CDMA2000. TDMA may be embodied through radio technologies such as global system for mobile communications (GSM)/general packet radio service (GPRS)/enhanced data rates for GSM evolution (EDGE). OFDMA may be embodied through radio technologies such as IEEE 802.16 (WiMAX), IEEE 802.20, and evolved UTRA (E-UTRA). OFDM may be embodied through radio technologies such as IEEE 802.11.

For clarity, the description will be mainly given of IEEE 802.11 (Wi-Fi). However, the technical spirit of the present invention is not limited thereto. For example, the description given below may be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

It should be noted that specific terms used in the description below are intended to provide better understanding of the present invention, and these specific terms may be changed to other forms within the technical spirit of the present invention. In some cases, well-known structures and devices are omitted in order to avoid obscuring the concepts of the present invention, and important functions of the structures and devices are mainly illustrated in block diagram form. The same reference numbers will be used throughout this specification to refer to the same or like parts. The sequential order of the operations discussed in this specification may be changed. Some elements or features of one embodiment may be included in another embodiment, or may be replaced by corresponding elements or features of another embodiment.

Conventional Method for WFDS Setup

Figure 1:
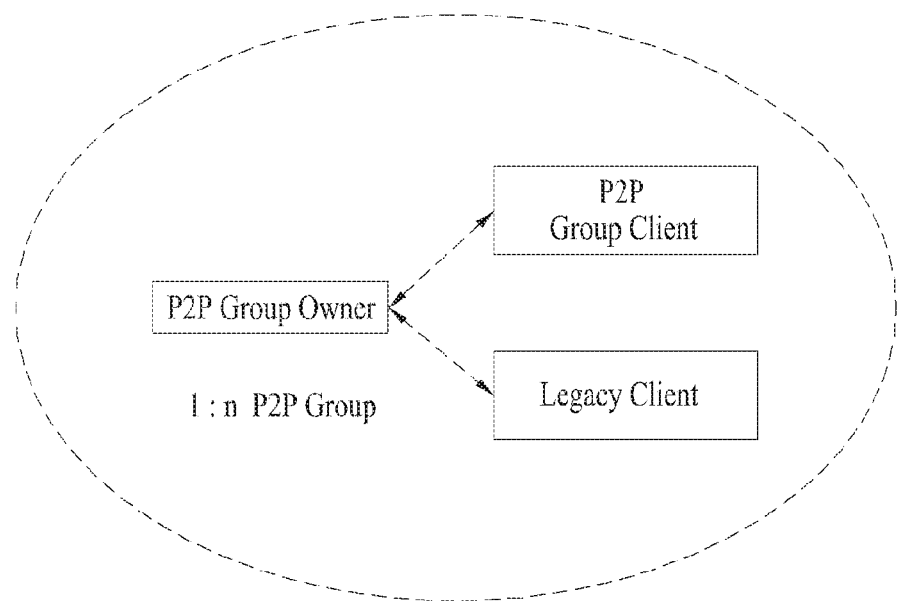
FIG. 1 shows typical P2P network topology.
Figure 2:
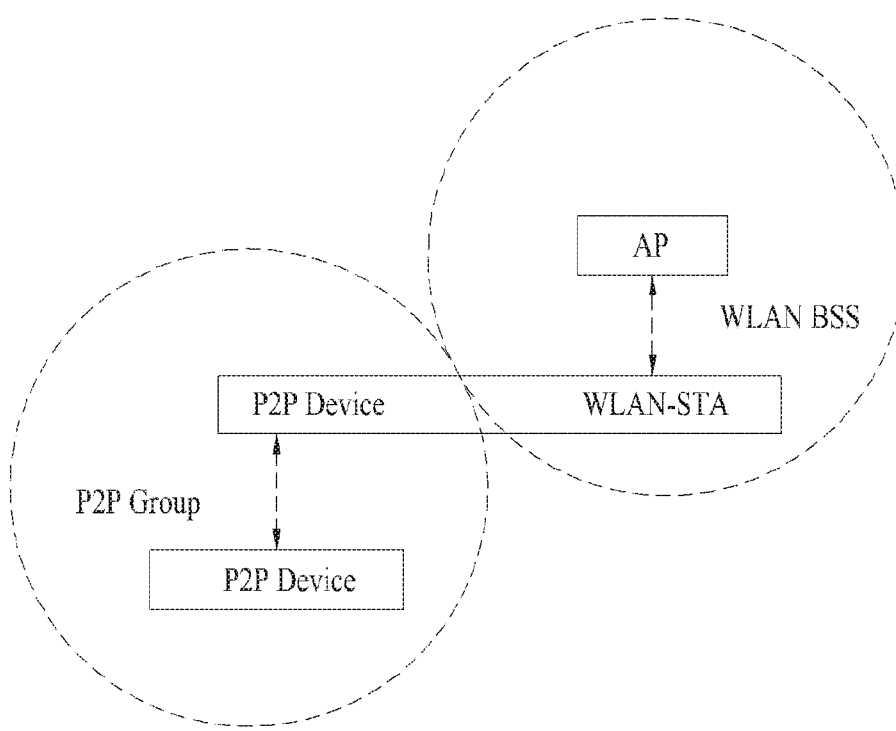
FIG. 2 illustrates a situation in which one P2P device forms a P2P group and operates as an STA of WLAN connected to an AP at the same time.
Figure 3:
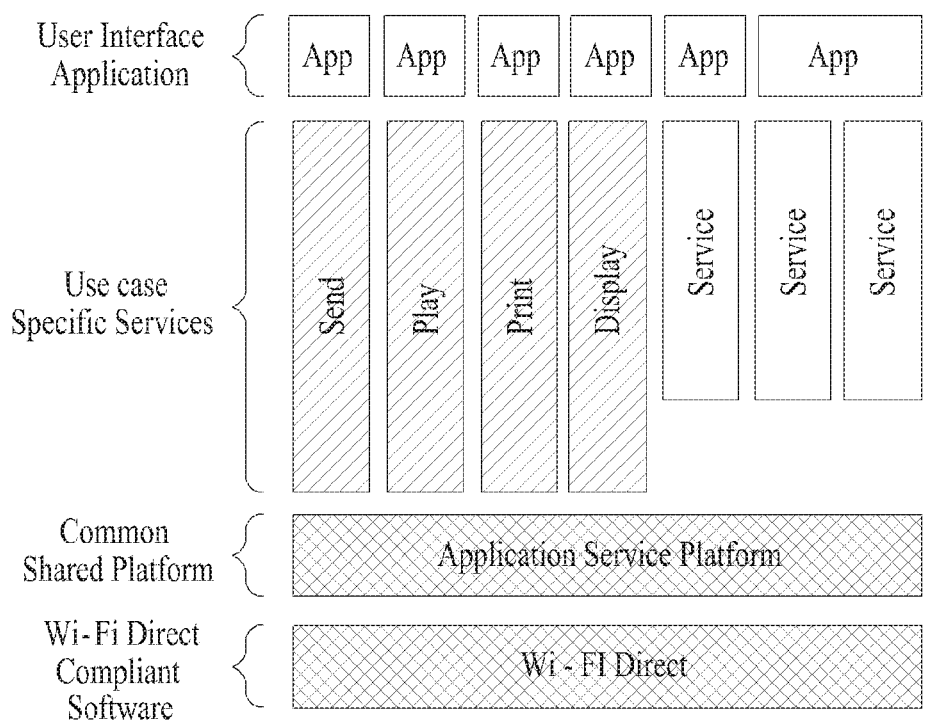
FIG. 3 is a schematic block diagram illustrating a Wi-Fi Direct Services device.

FIG. 3 is a schematic block diagram illustrating a Wi-Fi Direct Services (WFDS) device.

The Wi-Fi Direct MAC layer and upper layers define a platform for application services called an Application Service Platform (ASP). The ASP serves to implement session management between an upper application and lower Wi-Fi Direct, command execution of a service, inter-ASP control and security. On the ASP, four basic services defined in WFDS, namely Send, Play, Display and Print services, a corresponding application and User Interface (UI) are supported. Herein, the Send service refers to a service and application capable of sending files between two WFDS devices. The Play service represents a streaming service and application for sharing DLNA-based AN, photos and music between two WFDS devices. The Print service defines a service and application enabling printing of documents and photos between a device having content such as documents and photos and a printer. The Display service defines a service and application enabling sharing of a screen between the Miracast Sink and Miracast Source of WFA. Additionally, the Enable service is defined in order to use an ASP common platform in supporting a third party application in addition to the basic services.

Terms described in the present invention include Service Hash, which is formed from Service Name using first 6 octets of a service hash algorithm (e.g., SHA256 hash) for the Service Name. Service Hash employed in the present invention does not represent only a specific hash. The Service Hash should be preferably understood as a sufficient indication of a service name using a probe request/response discovery mechanism. For example, if Service Name is "org.wifi.example", the first 6 bytes of a value obtained by SHA256 hashing the Service Name correspond to a hash value.

In WFDS, when the Probe Request message includes a hash value matching a service, a Probe Response message containing a service name is sent in response to confirm whether or not the service is supported. The service name is a name of a user readable service in the form of DNS. The service hash value indicates the most significant 6 bytes of a 256-byte value of the service name generated through an algorithm (e.g., SHA256). As in the previous example, if the service name is "org.wifi.example", the service hash value may be "4e-ce-7e-64-39-49".

Accordingly, in the present invention, a part of a value generated by hashing the service name through the algorithm will be referred to as a service hash (information), which may be included in a message as one piece of information.

Figure 4:
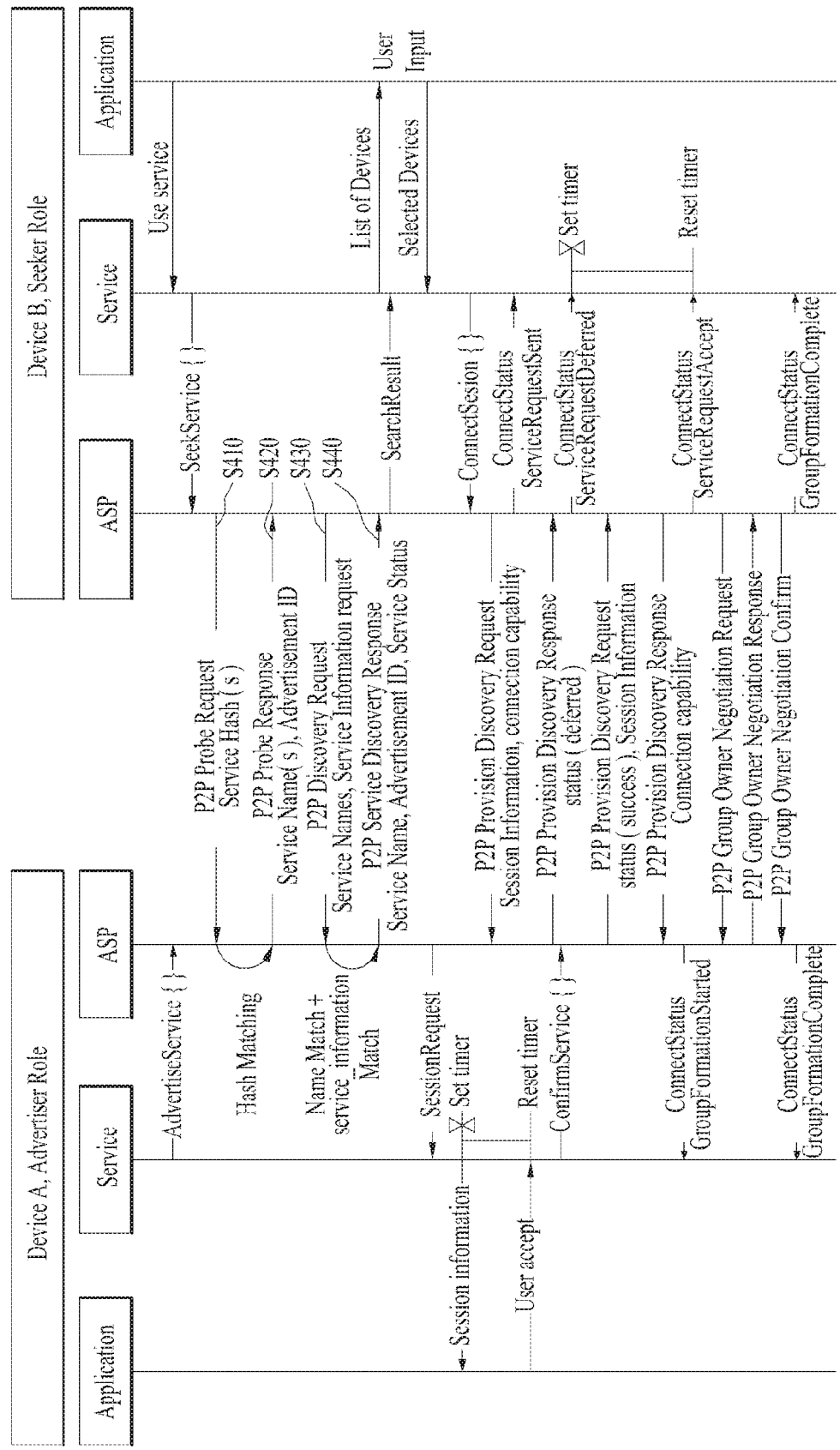
FIG. 4 illustrates a procedure of connecting to a WFDS session through device discovery and service discovery between WFDS devices in the legacy WFDS.

FIG. 4 illustrates a procedure of connecting to a WFDS session through device discovery and service discovery between WFDS devices in the legacy WFDS.

For simplicity of description, it will be assumed, as shown in FIG. 4, that Device A serves as an advertiser that advertises WFDS it can provide to a seeker and Device B serves to search for an advertised service. Device A is a device advertising the service thereof which a counterpart device attempts to find and start, and Device B performs a procedure of finding the device supporting the service according to a request from an upper layer application or the user.

The Service entity of Device A advertises WFDS it can provide to the Application Service Platform (ASP) entity of Device A. The Service entity of Device B may also advertise WFDS it can provide to the ASP entity of Device B. In the Device B, which serves as a seeker, the Application entity signals a WFDS service for Device B to use to the Service entity, and the Service entity in turn instructs the ASP entity to discover a device to use the WFDS.

The ASP entity of Device B transmits a P2P (peer to peer) Probe Request message in order to discover a WFDS target device thereof (S410). Herein, the ASP entity includes, in the P2P Probe Request message, a hashed service name in the form of a service hash of a service that the ASP entity attempts to discover or can support. When the service is supported, Device A receiving the P2P Probe Request message from the seeker transmits a P2P Probe Response message to Device B in response (S420). The P2P Probe Response message contains a service supported by the service name or hash value and a corresponding advertise ID. This procedure is a device discovery procedure, in which Device A and Device B are capable of recognizing each other as a WFDS device and identifying whether or not the service is supported.

Thereafter, the devices may optionally recognize details of a specific service through the P2P service discovery procedure. Once Device B discovers a device which can establish WFDS together with Device B, Device B transmits a P2P Service Discovery Request message to the device (S430). Upon receiving the P2P Service Discovery Request message from Device B, the ASP entity of Device A matches the service advertised by the Service entity of Device A with the P2P service name and P2P service information received from Device B, and transmits a P2P Service Discovery Response message to Device B (S440). This operation is performed using the GAS protocol defined in IEEE 802.11u. Once the request for service search is completed, Device B may inform the application and user of the search result. A Wi-Fi Direct group has not been formed yet. When the user selects a service and thus the service implements a Connect session, P2P group formation is implemented.

It should be noted that Wi-Fi Direct Services (WFDS) connection discussed in the present invention is differentiated from the legacy Wi-Fi Direct connection. While legacy Wi-Fi Direct mainly deals with layers up to layer L2, the WFDS connection which is recently under discussion deals with not only layer L2 but also higher layers and even service session connection established on the Application Service Platform. Accordingly more various and complex examples may be provided than in connection of the legacy L2 layer, and definition of such examples is required. Additionally, configuration and order of control frames exchanged through Wi-Fi are changed when Wi-Fi Direct connection between devices is performed alone or when connection between Wi-Fi Direct services is performed. As an example, device search and WFDS connection through NFC are discussed below.

NFC Device Discovery Procedure

Figure 5:
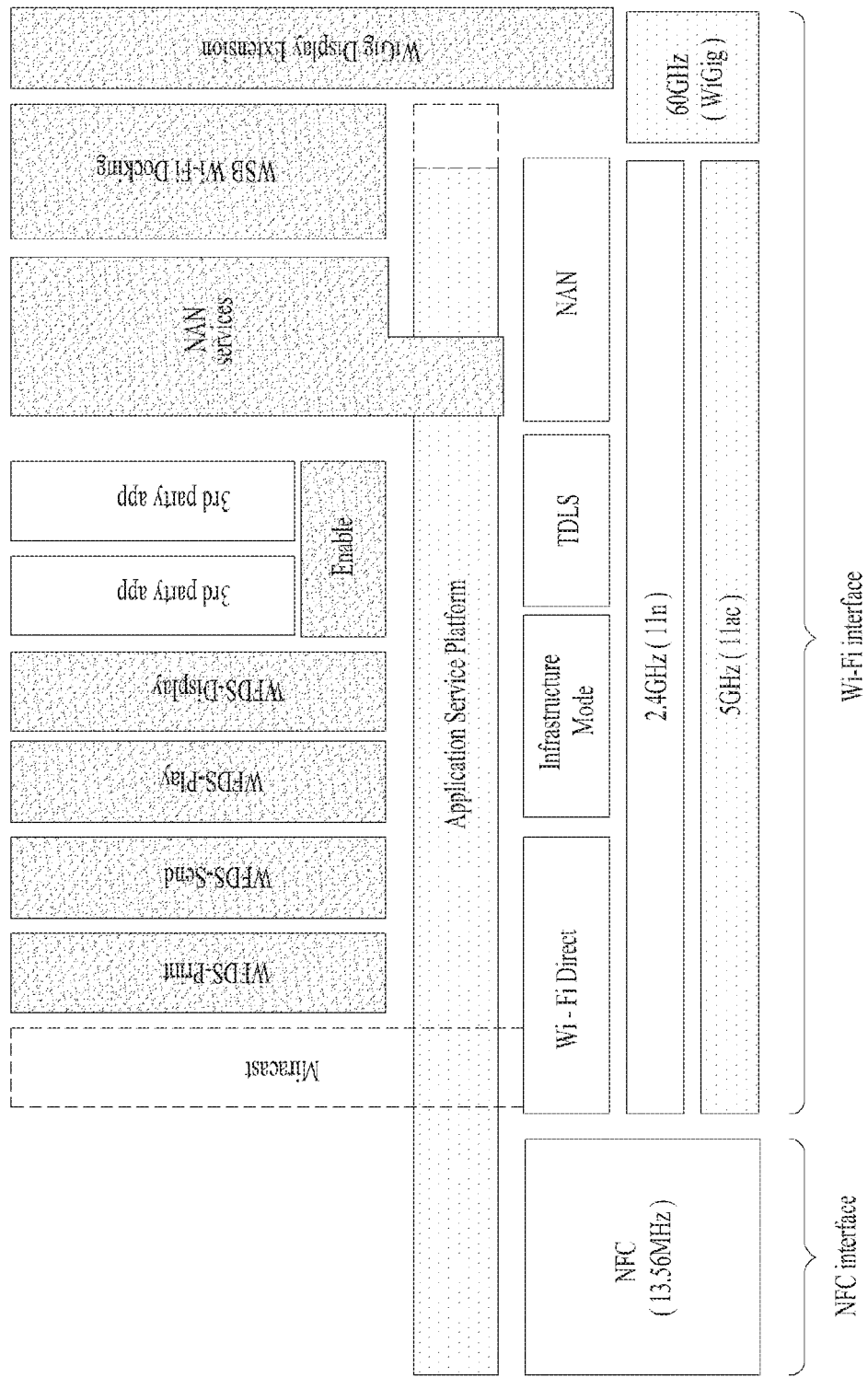
FIG. 5 is a block diagram illustrating a service with an NFC interface in addition to a Wi-Fi interface.

FIG. 5 is a block diagram illustrating a service with an NFC interface in addition to a Wi-Fi interface.

As shown in FIG. 5, the conventional Wi-Fi interface uses frequencies in the 2.4 GHz band in 802.11n and in the 5 GHz band in 802.11ac. It can be seen from the figure that the NFC interface operates at a relatively lower frequency band of 13.56 MHz. On the Wi-Fi interface, services such as Wi-Fi Direct (WFD), Infrastructure mode, Tunneled Direct Link Setup (TDLS) and Neighbor Area Network (NAN) may be used. ASP needs to be applied to NFC to unify management. In addition, as the WFDS technology develops, support of a 3rd party application and the like is increasingly demanded. Hereinafter, NFC employed in the present invention will be described.

When two P2P devices support NFC, an NFC OOB (out-of-band) channel may be optionally used in the device discovery phase. A searching P2P device may use the NFC OOB channel to discover a P2P device. NFC OOB device discovery means that the two P2P devices agree on a common channel for group formation and share provisioning information such as passwords of the devices.

A P2P device or the P2P GO may use a NFC handover request/select message for OOB device discovery. The NFC handover request/select message is exchanged over the OOB channel prior to group formation or P2P invitation.

Figure 6:
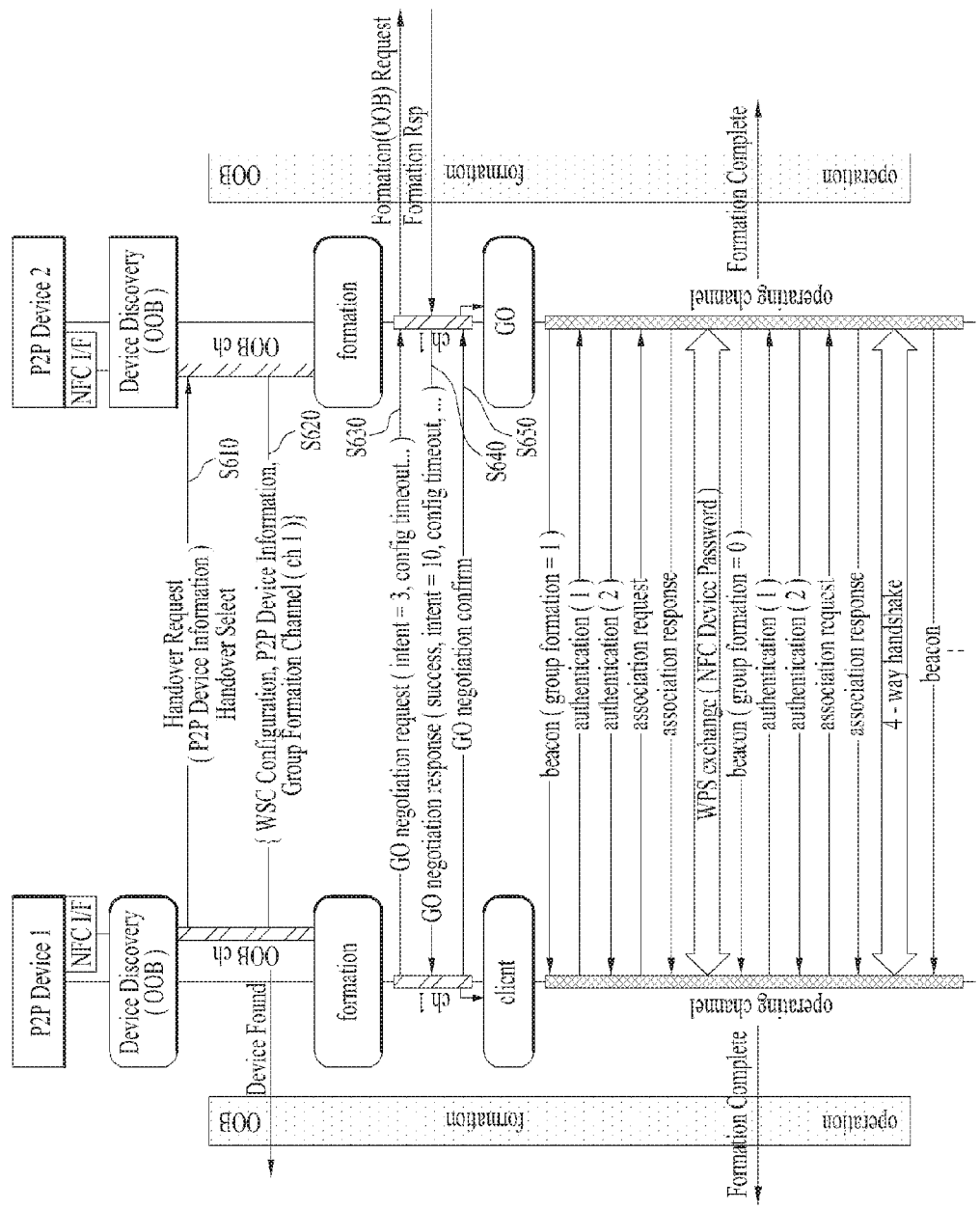
FIG. 6 is a diagram illustrating a handover procedure in conventional NFC.

FIG. 6 is a diagram illustrating a handover procedure in conventional Near Field Communication (NFC).

As shown in FIG. 6, each of Device 1 and Device 2 supports NFC. Each device includes an NFC module as a component, and connection for NFC is established through an Out-of-Band (OOB) channel. That is, a connection is established by creating a new channel distinguished from the channel used for the legacy Wi-Fi Direct connection.

Before description of the NFC handover procedure is given, types of NFC will be described. NFC is divided into NFC chip and NFC tag according to types of NFC modules. When NFC is configured in a device as a chip, information may be read or written through the NFC. If the NFC is configured as a tag (e.g., sticker), only a read function may be provided.

FIG. 6 illustrates the procedure on the assumption of a Negotiation type of NFC capable of reading and writing bidirectional information. First, NFC Device 1 transmits a handover request message in order to find an NFC connection target device (S610). The handover request message contains P2P device information, which is information needed for Device 1 to perform communication. When Device 2 receives the handover request message from Device 1, Device 2 transmits to Device 1 a Handover Select message containing P2P device information, which is needed for Device 2 to perform communication, Wi-Fi Simple Configuration (WSC) configuration information and group formation channel information (S620). The Handover Select message may further contain listen channel attribute information for GO negotiation or P2P group re-invoke When two P2P devices each possessing an NFC interface come close to each other, new NFC communication may be established. In this case, NFC communication is based on the NFC forum Logical Link Control Protocol (LLCP) standard. When a device attempts to execute wireless communication, a request for matching of technology including essential configuration data may be made to the device.

Thereafter, the devices having exchanged device information with each other process with a group formation procedure to configure one communication group. When one P2P device discovers another P2P device in the OOB device discovery procedure, the group formation procedure is implemented if the discovered P2P device is not a member of a persistent P2P group. If the P2P device receives an invitation response indicating "Failure: unknown P2P group" after attempting to re-execute the persistent P2P group, the P2P device may reattempt group formation using the GO negotiation procedure. Device 1 may transmit a GO Negotiation Request message to Device 2 based on the group formation channel information contained in the Handover Response message received from Device 2 (S630). The GO Negotiation Request message may contain information such as an intent value (a value of 0 to 15) and configuration timeout allowing Device 1 to be the GO. Upon receiving the GO Negotiation Request message, Device 2 transmits a GO Negotiation Response message to Device 1 over a channel on which Device 1 sent the message (S640). The GO Negotiation Response message may contain information such as the GO intent value and configuration timeout of Device 2. Since the two devices share the GO intent values, Device 2 having the greater GO intent value may become the GO, and Device 1 may transmit a GO Negotiation Confirm message to Device 2 by configuring connection information about the GO and the group (S650). Device 1 and Device 2 may complete the group formation procedure based on the information in the GO Negotiation Confirm message.

As convenience of NFC technology is enhanced, the initial stage of connection may be implemented using the NFC scheme in configuring a communication group between devices supporting Wi-Fi Direct Services (WFDS).

In NFC OOB, a device to initiate Handover Request serving as Probe Request may be unpredictable. This is because transmission of a Handover Request message from the seeker seeking a service does not cause a problem, but transmission of a Handover Request message from the advertiser may cause a problem. For NFC devices, when the two terminals touch, it is difficult to distinguish between the one serving as the subject and the other serving as the object. That is, it cannot be concluded that a device transmitting the Handover Request message is the seeker.

There is another problem. If the given mode is not the P2P mode through NFC, there is no way to process the hash value indicating which specific service is to be used. If the mode is a Read/Write mode or Card Emulator mode, a service to be used may not be identified. In this case, a procedure of specifically checking the service is needed In this regard, the present invention proposes that the device discovery procedure be implemented through NFC OOB by harmonizing the Wi-Fi Direct connection mechanism for WFDS with the Wi-Fi Direct connection mechanism for NFC.

In implementing the device discovery phase through NFC OOB, the present invention proposes that service hash information be transmitted by being included in a handover request message and a response is made by including service name information matching the service hash information in a Handover Select message. In particular, when a service is provided through NFC, it is proposed that a service initiator be indicated through a new field in the Handover Request/Select message.

Hereinafter, description will be given of a case where the subject to transmit the NFC Handover Request message is a seeker that seeks a WFDS service and a case where the subject to transmit the NFC Handover Request message is not a seeker, respectively.

Negotiation NFC Handover

Embodiment 1

There is No Specific Seeker

Embodiment 1-1

Two Devices Support NFC

Figure 7:
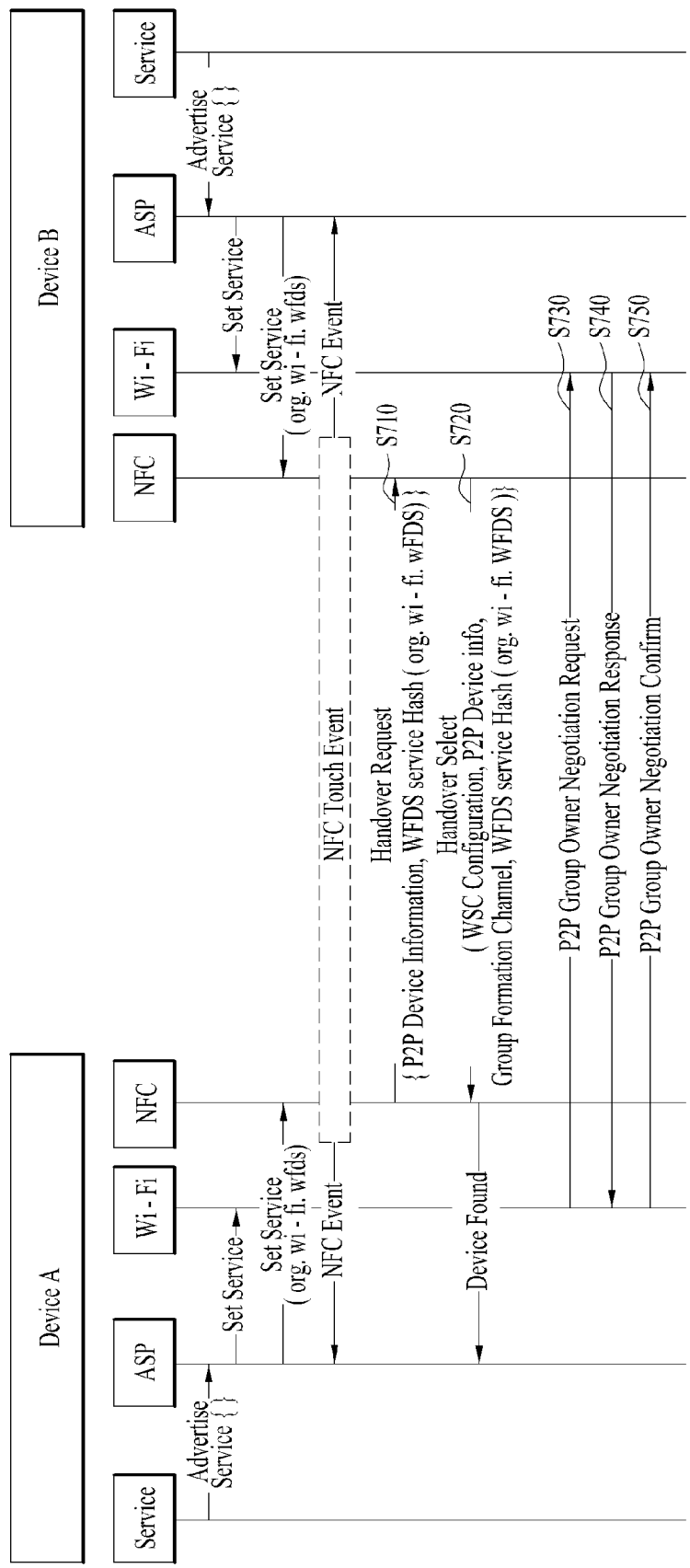
FIG. 7 is a diagram illustrating an example of a WFDS connection procedure using NFC handover employed in the present invention.

FIG. 7 is a diagram illustrating an example of a WFDS connection procedure using NFC handover employed in the present invention.

As shown in FIG. 7, both Device A and Device B support Wi-Fi and NFC. In the illustrated example, neither of the two devices is a seeker that seeks a service. In each device, the Service entity may advertise a WFDS service that the device can support to the ASP entity. The ASP entity may configure the advertised service in the Wi-Fi module and NFC module. The ASP entity may configure the advertised service information in the Wi-Fi module and NFC module simultaneously or sequentially, and define the service based on a certain command (e.g., org.wi-fi.wfds.send.rx).

Since neither of the two devices is a service seeker, the handover procedure may be initiated only after NFC touch occurs. Herein, NFC touch may be a touch or a proximity touch. For NFC touch between the two devices, it is difficult to distinguish which of the devices is the subject of touch. Therefore, information on the initiator is needed.

After touch is implemented, Device A may transmit a Handover Request message to Device B (S710). Herein, the Handover Request message may contain not only P2P device information on Device A but also service hash information thereon. In this case, the service hash information may include service information transmitted from the Service entity of Device A to the ASP entity and from the ASP entity to the NFC entity. That is, it may include WFDS which Device A can provide.

Upon receiving the handover request message from Device A, Device B may transmit a Handover Select message containing service information that Device B can provide (S720). Herein, the Handover Select message may contain service name information. The message may further contain WSC configuration information, P2P device information and group formation channel information.

As described above with reference to FIG. 5, the group formation channel information is information contained in the Handover Select message. For WFDS, the channel information is contained such that the group formation procedure is implemented on the conventional social channels (listen channels), i.e., channels 1, 6 and 11. For Wi-Fi Direct connection through NFC, a new channel may be defined and group formation may be performed on the new channel. In this case, one of the channels 1, 6 and 11 may be selected as a WFDS channel in the P2P group negotiation procedure by Device A, and the group formation phase may be implemented on another channel selected as an NFC channel. If the group formation phase is implemented in this way, this may apply overload to the devices and cause large consumption of resources in controlling the phase as one device manages two modules separately. Therefore, if one of the social channels 1, 6 and 11 used in existing WFDS is used in NFC, resources may be efficiently utilized for integrated management.

The Handover Select message may contain configuration information enabling discovery of a device via the listen channel used for Wi-Fi Direct connection. This configuration information may take the form of a listen channel attribute. The listen channel attribute may be contained not only in the Handover Select message but also in the Probe Request frame or the GO Negotiation Request message. The listen channel attribute may include listen channel and operating class information. For the listen channel attribute format, refer to Table 1 below.

TABLE 1

| Field | Size (octets) | Value | Description |
| --- | --- | --- | --- |
| Attribute ID | 1 | 6 | This field determines the type of a P2P attribute |
| Length | 2 | 5 | Length of the attribute field |
| Country String | 3 | | This field includes the value of the dot11Country String attribute |
| Operating Class | 1 | | This field indicates the frequency band of a P2P device in the listen state |
| Channel Number | 1 | | This field indicates the channel number of a P2P device in the listen state |

After exchanging services which the two devices can provide to each other, the devices may proceed with the group formation phase. Compared to conventional cases in which P2P Service Discovery Request/Response messages are exchanged to perform group formation after P2P Probe Request/Response frames are exchanged, this phase may be simplified. Thereby, the device discovery phase may be implemented more quickly and efficiently.

Device A may transmit a P2P Group Owner Negotiation Request message to Device B (S730). The Group Owner Negotiation Request message contains information such as an intent value (a value of 0 and 15) allowing Device A to become GO and configuration timeout. Upon receiving the Group Owner Negotiation Request message, Device 2 transmits a Group Owner Negotiation Response message to Device 1 over a channel on which Device 1 sent the message (S740). The Group Owner Negotiation Response message may contain information such as the GO intent value and configuration timeout of Device 2. Since the two devices share the GO intent values, Device 2 having the greater GO intent value may become the GO, and Device 1 may transmit a Group Owner Negotiation Confirm message to Device 2 by configuring connection information about the GO and the group (S750). Device 1 and Device 2 may complete the group formation procedure based on the information in the Group Owner Negotiation Confirm message. Thereby, Wi-Fi Direct Services (WFDS) are prepared to be used in a P2P group.

Once one P2P group is formed in the phase implemented as above, each device may store the configuration information from the group formation procedure in a storage unit. Thereafter, when connection with the same terminal needs to be reestablished to form a group, the connection procedure may be efficiently implemented using the stored configuration information. Even if connection with another terminal needs to be established, a part or entirety of the stored configuration information may be used as long as the same or similar performance or the same or similar condition is given. That is, connection may be established with the authentication procedure by optionally storing connection information and granting connection credential.

A persistent ASP-P2P group may be formed using a WFDS Default Configuration method or a WSC PIN method. The ASP does not use the WFDS Default Configuration method for installation of a service network to use the persistent group, but uses only WSC PIN as a WSC configuration method. Similarly, a service network present between ASPs configured using the WFDS Default Configuration method does not set up an ASP session of a service for using only WSC PIN as a WSC configuration method.

Embodiment 1-2

Connection Between WFDS Device and Non-WFDS Device

Figure 8:
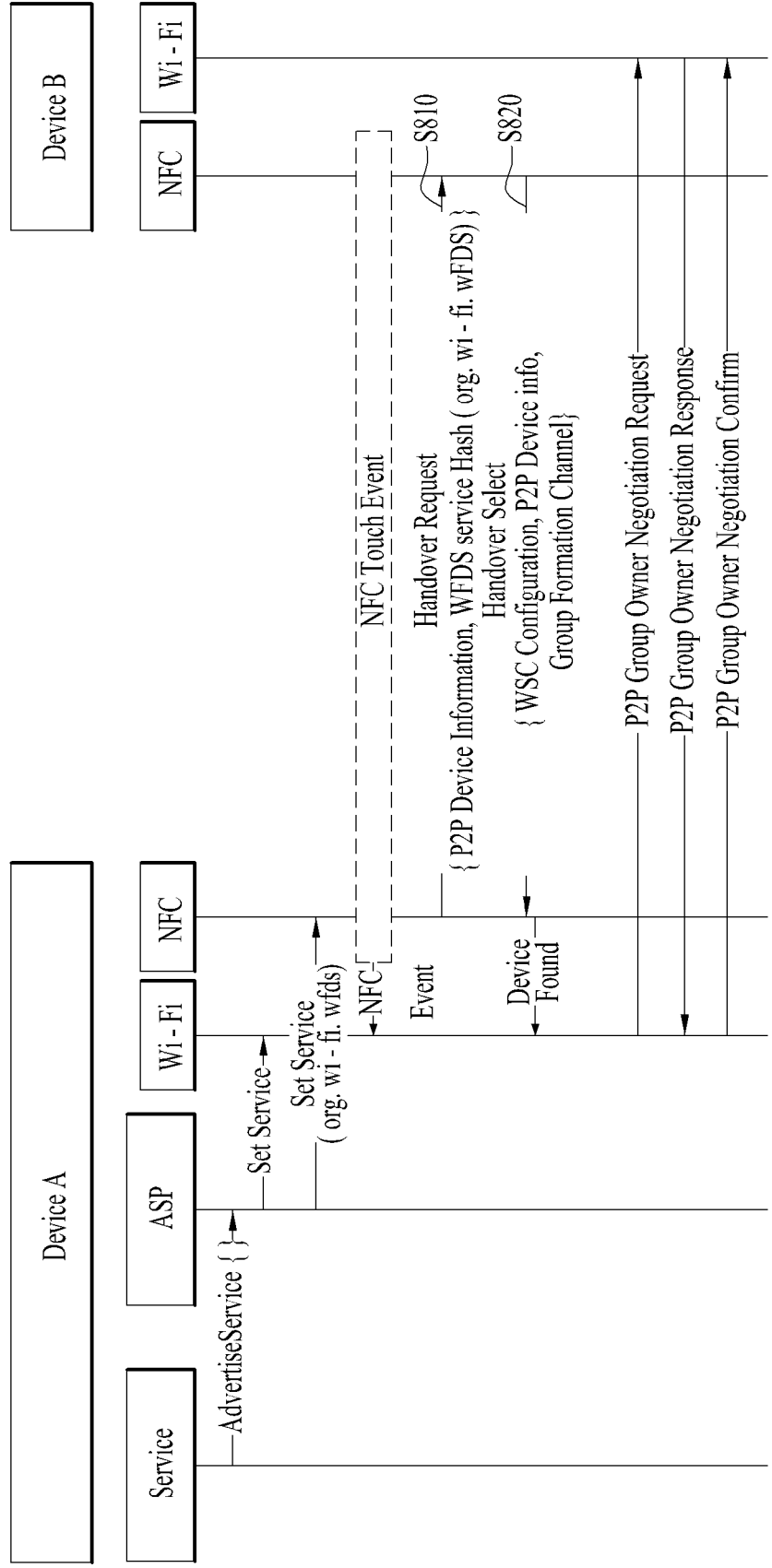
FIG. 8 is a diagram illustrating another example of the WFDS connection procedure using NFC handover employed in the present invention.

FIG. 8 is a diagram illustrating another example of the WFDS connection procedure using NFC handover employed in the present invention.

As shown in FIG. 8, it is assumed that Device A supports both Wi-Fi and NFC as well as WFDS, but Device B does not support WFDS. Hereinafter, transmission of a handover request message from Device A to Device B performed on this assumption will be described. As described above with reference to FIG. 7, Device A may transmit a service which the Service entity may provide to the ASP entity and the ASP may provide to the Wi-Fi and NFC entitys respectively.

Device A transmits a handover request message to Device B after NFC touch occurs (S810). The handover request message may contain P2P device information on Device A and WFDS service hash information on Device A.

In response to the handover request message, Device B may transmit a Handover Select message to Device A (S820). The Handover Select message may contain P2P device information on Device B, WSC configuration information, and group formation channel information. Since Device B is not a WFDS device, it does not have information on a WFDS service. Accordingly, the service name information may not be contained in the Handover Select message. Since Device A never receives service name information from Device B, WFDS is not available to Device A. Therefore, Device A may use the normal Wi-Fi Direct connection mechanism.

Embodiment 1-3

Connection Between WFDS Device and Non-WFDS Device

Figure 9:
FIG. 9 is a diagram illustrating another example of the WFDS connection procedure using NFC handover employed in the present invention.

FIG. 9 is a diagram illustrating another example of the WFDS connection procedure using NFC handover employed in the present invention.

As shown in FIG. 9, it is assumed that Device A supports both Wi-Fi and NFC as well as WFDS, but Device B does not support WFDS. Hereinafter, transmission of a handover request message from Device B to Device A, which is different from Embodiment 1-2, will be described. As described above with reference to FIGS. 7 and 8, Device A may transmit a service which the Service entity may provide to the ASP entity and the ASP may provide to the Wi-Fi and NFC entitys respectively.

Device B may transmit a handover request message to Device A after NFC touch occurs (S910). In this case, since Device B is not a WFDS supporting device, P2P device information may be contained in the handover request message. However, service hash information may not be contained in the message, in contrast with the previous embodiment.

Device A may transmit a Handover Select message containing P2P device information in response since the handover request message received from Device B is normal P2P device information (S920). The Handover Select message may further contain WSC configuration information and group formation channel information. In addition, although WFDS is not supported by Device B, Device A may transmit the Handover Select message containing a WFDS service hash or service name which Device A may provide.

Embodiment 2

When a Seeker is Present

Hereinafter, description will be given of a case when a device to use WFDS is present. Sending a Handover Request message to a target device attempting to use a WFDS service in the device with a seeker from a seeker which seeks the target device may not cause a problem. However, in the NFC scheme, a device to send a Handover Request message cannot be identified. That is, the target device may send the Handover Request message. Accordingly, hereinafter, description will be given of a case when a Handover Request/Select message is transmitted with information on a service initiator as well as existing connection configuration information contained in the message.

Embodiment 2-1

When One of Two Devices is a Seeker

Figure 10:
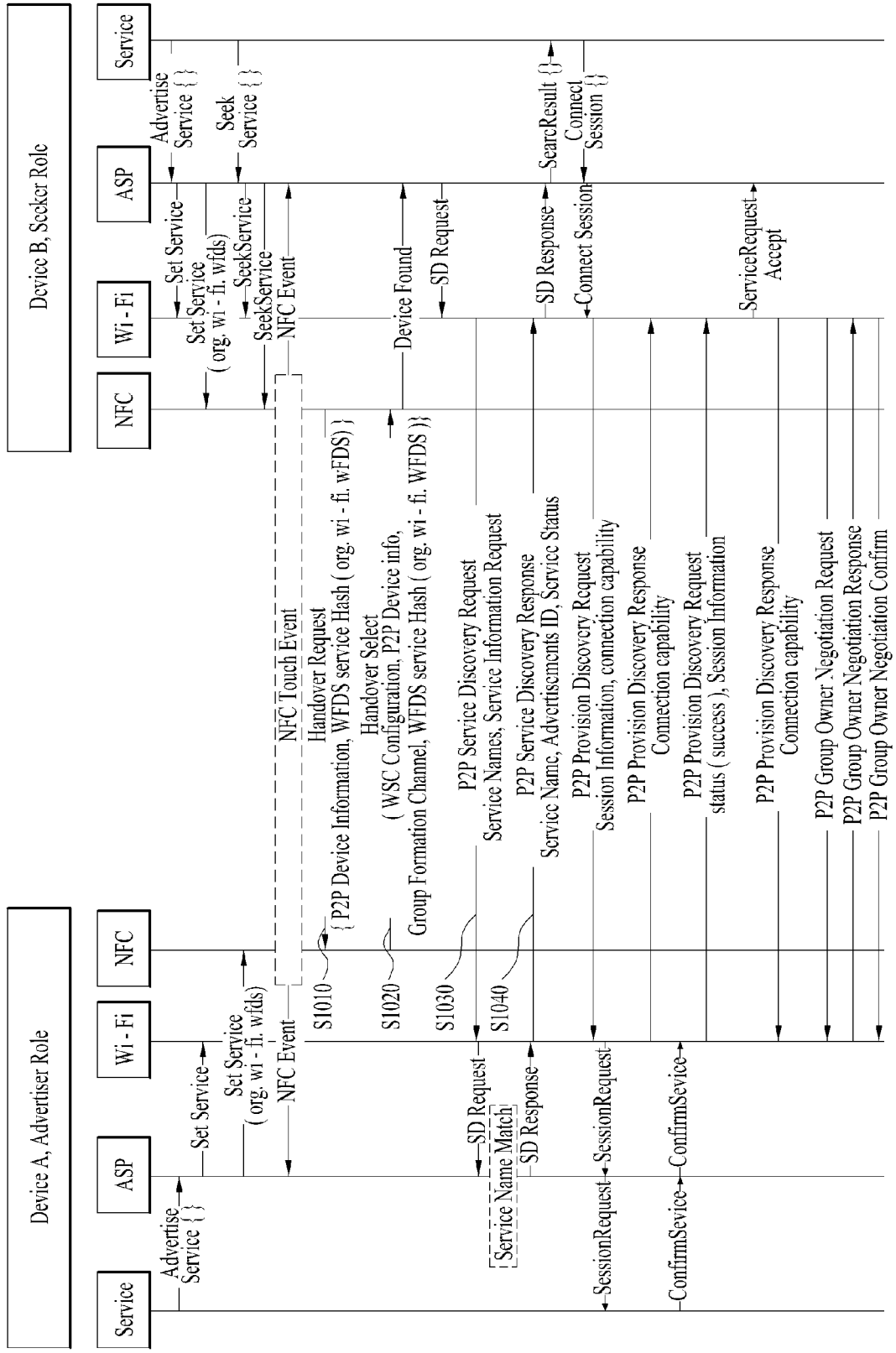
FIG. 10 is a diagram illustrating another example of the WFDS connection procedure with NFC handover employed in the present invention, in which one device serves as a seeker.

FIG. 10 is a diagram illustrating another example of the WFDS connection procedure with NFC handover employed in the present invention, in which one device serves as a seeker.

As shown in FIG. 10, both Device A and Device B may support Wi-Fi and NFC. In this example, Device A serves as an advertiser that advertises WFDS that the advertiser can provide, and Device B serves as a seeker that seeks a WFDS target device.

Since both devices are WFDS supporting devices, the Service entity may advertise a WFDS service which each device can support to the ASP entity.

Device B needs to discover a target device in order to use WFDS. Accordingly, in Device B, the Service entity may command the ASP entity to search for a service, and the ASP entity receiving this command may in turn deliver the search command to the Wi-Fi entity and NFC entity. These operations are performed prior to NFC touch.

After NFC touch occurs, Device B, which is a seeker, may transmit a Handover Request message to Device A (1010). The Handover Request message may contain P2P device information and WFDS service hash information of Device B. In addition to the service hash information, the Handover Request message may contain information indicating that Device B is a seeker of WFDS. The message may further contain information indicating which device will initiate the service, namely service initiator information. Upon receiving the Handover Request message from Device B, Device A may transmit, to Device B, a Handover Select message containing service information that Device A can provide, namely a Handover Select message containing a service name (S1020). The Handover Select message may contain P2P device information in addition to the service hash information. By exchanging the Handover Request/Select messages, Device A and Device B may share WFDS which they can provide, and Device A may further acquire service information which Device B attempts to use.

Device A and Device B perform device discovery in the Handover Request/Select procedure. Device A and Device B exchange WFDS service information with each other in this phase, and optionally may perform the P2P service discovery procedure.

As Device B recognizes the service hash information on Device A, Device B may transmit a P2P Service Discovery Request message for service discovery of Device A (S1030). Herein, the P2P Service Discovery Request message may contain Service Name information on a service that Device B attempts to use and a Service Information Request message.

Upon receiving the P2P service discovery request message from Device B, Device A may transmit a P2P Service Discovery Response message in response by matching the service name (S1040). The P2P Service Discovery Response message may contain service name information which Device A can provide, Advertisement ID and Service Status information. Thereafter, a WFDS session may be implemented through the P2P Provision Discovery Request/Response procedure.

Embodiment 2-2

When One of Two Devices is a Seeker

FIG. 11 is a diagram illustrating another example of the WFDS connection procedure with NFC handover employed in the present invention, in which one device serves as a seeker.

As shown in FIG. 11, both Device A and Device B support Wi-Fi and NFC. In this example, Device A serves as an advertiser that advertises WFDS that the advertiser can provide, and Device B serves as a seeker that seeks a WFDS target device. It should be noted that Device A, which serves as an advertiser, transmits a handover request message, in contrast with Embodiment 2-1.

Since both devices are WFDS supporting devices, the Service entity may advertise WFDS which each device can support to the ASP entity.

Device B needs to discover a target device in order to use WFDS. Accordingly, in Device B, the Service entity may command the ASP entity to search for a service, and the ASP entity receiving this command may in turn deliver the search command to the Wi-Fi entity and NFC entity. These operations are performed prior to NFC touch.

After NFC touch occurs, Device A may transmit a Handover Request message (S1110). Device A does not recognize that Device B is a seeker even though there is NFC touch and Device B is a seeker. For this reason, the message may be transmitted first. The Handover Request message may contain P2P device information and WFDS service hash information of Device A. In addition to the service hash information, the Handover Request message may contain information indicating that Device A is an advertiser of WFDS. The message may further contain information indicating which device will initiate the service, namely service initiator information. Upon receiving the Handover Request message from Device A, Device B may transmit, to Device A, a Handover Select message containing service information that Device B can provide, namely a Handover Select message containing a service hash (S1120). The Handover Select message may contain P2P device information in addition to the service hash information. The Handover Select message may further contain information indicating that Device B is a seeker attempting to use the WFDS service.

By exchanging the Handover Request/Select messages, Device A and Device B may share WFDS which they can provide, and Device A may further acquire service information which Device B attempts to use.

The Wi-Fi entity of Device B may transmit a P2P Probe Request message to Device A (S1130). The Handover Request message received from Device A is not a message that Device B has required, and thus the message may not contain all information Device B desires to obtain from Device A. Accordingly, the probe request phase may be implemented. Device B may reject or ignore an operation for P2P connection from Device A before Device B proceeds with the probe request phase, and the device discovery phase may be driven by Device B which serves as a seeker. In response to the P2P Probe Request message, Device A transmits a P2P Probe Response message to Device B (S1140). For details of this probe procedure, which is a device discovery phase, refer to the device discovery phase described above.

The two devices having discovered each other perform the service discovery phase. Device B, which is a service seeker, may transmit a P2P service discovery request message to Device A (S1150). The P2P service discovery request message may contain service name information on WFDS that Device B attempts to use. The message may further contain a Service Information Request message.

Upon receiving the P2P service discovery request message from Device B, Device A may transmit a P2P Service Discovery Response message in response by matching the service name (S1160). The P2P Service Discovery Response message may contain service name information which Device A can provide, Advertisement ID and Service Status information. Thereafter, a WFDS session may be implemented through the P2P Provision Discovery Request/Response procedure.

Embodiment 2-3

When Both Devices are Seekers

FIG. 12 is a diagram illustrating another example of the WFDS connection procedure with NFC handover employed in the present invention, in which both devices serve as seekers.

As shown in FIG. 12, both Device A and Device B support Wi-Fi and NFC. In this example, Device A and Device B serve as seekers that seek a WFDS target device.

Since both devices are WFDS supporting devices, the Service entity may advertise WFDS which each device can support to the ASP entity.

Device A and Device B need to discover a target device in order to use WFDS. Accordingly, in each of Device A and Device B, the Service entity may command the ASP entity to search for a service, and the ASP entity receiving this command may in turn deliver the search command to the Wi-Fi entity and NFC entity. These operations are performed prior to NFC touch.

After NFC touch occurs, Device B which is a seeker may transmit a Handover Request message to Device A (1210). Since both devices are seekers, the following details are also applied to a case when Device A transmits a Handover Request message. The Handover Request message may contain P2P device information and WFDS service hash information of Device B. In addition to the service hash information, the Handover Request message may contain information indicating that Device B is a seeker of WFDS. The message may further contain information indicating which device will initiate the service, namely service initiator information. Upon receiving the Handover Request message from Device B, Device A may transmit, to Device B, a Handover Select message containing service information that Device A can provide, namely a Handover Select message containing a service hash (S1220). The Handover Select message may contain P2P device information in addition to the service hash information. By exchanging the Handover Request/Select messages, Device A and Device B may share WFDS which the devices can provide, and further acquire service information that Device A and Device B attempt to use.

Device A and Device B perform device discovery in the Handover Request/Select procedure. Although Device A and Device B exchange WFDS service information with each other in this phase, they may perform the P2P Probe procedure.

The Wi-Fi channel entity of Device B may transmit a P2P Probe Request message to Device A (S1230). The handover request message received from Device B is not a message that Device A required first, and thus the message may not contain all information Device B desires to obtain from Device A. In response to the P2P Probe Request message, Device A transmits a P2P Probe Response message to Device B (S1240). For details of this probe procedure, which is a device discovery phase, refer to the device discovery phase described above.

The two devices having discovered each other perform the service discovery phase. Device B, which is a service seeker, may transmit a P2P service discovery request message to Device A (S1250). The P2P service discovery request message may contain service name information on WFDS that Device B attempts to use. The message may further contain a Service Information Request message.

Upon receiving the P2P service discovery request message from Device B, Device A may transmit a P2P Service Discovery Response message in response by matching the service name (S1140). The P2P Service Discovery Response message may contain service name information which Device A can provide, Advertisement ID and Service Status information. Thereafter, a WFDS session may be implemented through the P2P Provision Discovery Request/Response procedure.

After completing service discovery, the two devices may perform a subsequent procedure for WFDS connection. Device B may transmit a P2P Provision Discovery Request message to Device A via a Wi-Fi channel (S1170). At this time, Device A may also transmit a P2P Provision Discovery Request message. One of Device A and Device B that transmits a P2P Provision Discovery Request message to the counterpart device first may have a right for service initiation. Alternatively, the right for service initiation may be granted to one device that has priority over the other device.

Herein, the priority refers to assignment of the right for service initiation to one of the two devices that is objectively more capable of efficient management than the other one according to the number of WFDS communications that the devices have established, performances of the devices and, and the type of WFDS. For example, if Device A is performing two communications in WFD and Device B is not performing a previous communication, Device B may have priority. If hardware performance of Device A is better than that of Device B, Device A may have priority. The priority may be assigned differently depending on which of Send, Display, Play or Print services is a WFDS service to be used.

Embodiment 3

Figure 13:
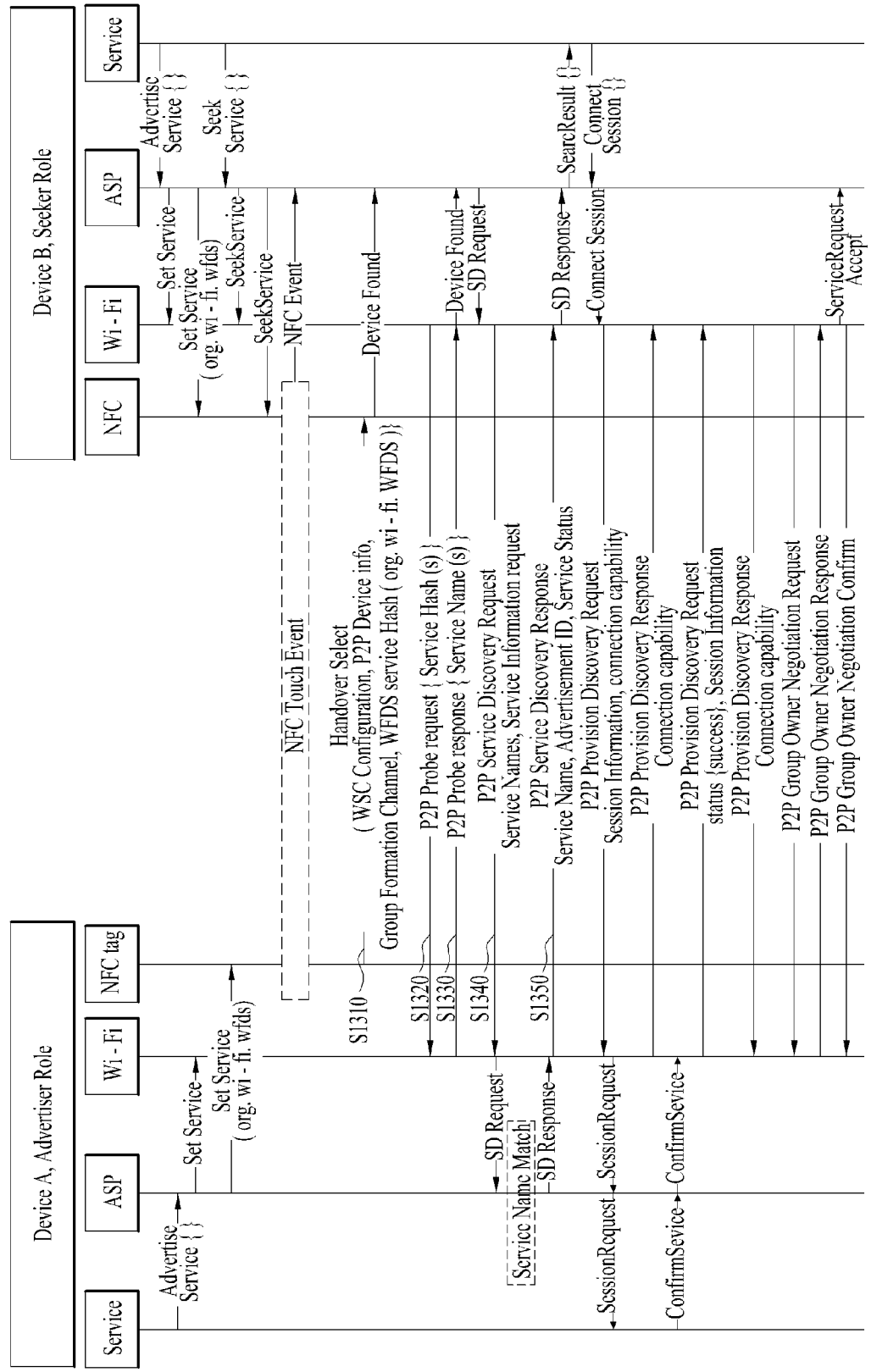
FIG. 13 is a diagram illustrating another example of the WFDS connection procedure with NFC handover employed in the present invention, in which an NFC static device serves as a seeker and an NFC negotiation device serves as a seeker.

When an NFC Static Device is an Advertiser and an NFC Negotiation Device is a Seeker FIG. 13 is a diagram illustrating another example of the WFDS connection procedure with NFC handover employed in the present invention, in which an NFC static device serves as a seeker and an NFC negotiation device serves as a seeker.

As shown in FIG. 13, both Device A and Device B support Wi-Fi and NFC. In this example, Device A serves as an advertiser that advertises WFDS that the advertiser can provide, and Device B serves as a seeker that seeks a WFDS target device. It should be noted that Device A serving as an advertiser is an NFC static device (e.g., an NFC tag), and Device B serving as a seeker is an NFC negotiation device.

Since both devices are WFDS supporting devices, the Service entity may advertise a WFDS service which each device can support to the ASP entity.

Device B needs to discover a target device in order to use WFDS. Accordingly, in Device B, the Service entity may command the ASP entity to search for a service, and the ASP entity receiving this command may in turn deliver the search command to the Wi-Fi entity and NFC entity. These operations are performed prior to NFC touch.

The NFC touch in this embodiment is different from that for the previous negotiation device. Since Device A is an NFC tag, handover of the two devices is static. As an NFC tag, Device A transmits a Handover Select message to Device B (S1310). Specifically, Device A transmits a Handover Select message containing service information registered in the tag rather than transmitting a handover request message. The Handover Select message may contain P2P device information and WFDS and service hash information on Device A. in addition to the service hash information, the Handover Select message may contain information indicating that Device A is an advertiser of WFDS. The Handover Select message may further contain information indicating which device will initiate the service, namely service initiator information. The message may also contain group formation channel information and WSC configuration information.

Upon receiving the Handover Select message from Device A, Device B may perform the P2P Probe procedure via a Wi-Fi channel since it has unilaterally received the message from Device A rather than exchanging messages with Device A even though it has discovered the target device.

The Wi-Fi channel entity of Device B may transmit a P2P Probe Request message to Device A (S1320). In response to the P2P Probe Request message, Device A transmits a P2P Probe Response message to Device B (S1330). For details of this probe procedure, which is a device discovery phase, refer to the device discovery phase described above.

The two devices having discovered each other perform the service discovery phase. Device B, which is a service seeker, may transmit a P2P service discovery request message to Device A (S1340). The P2P service discovery request message may contain service name information on WFDS that Device B attempts to use. The message may further contain a Service Information Request message.

Upon receiving the P2P service discovery request message from Device B, Device A may transmit a P2P Service Discovery Response message in response by matching the service name (S1350). The P2P Service Discovery Response message may contain service name information which Device A can provide, Advertisement ID and Service Status information. Thereafter, a WFDS session may be implemented through the P2P Provision Discovery Request/Response procedure.

Embodiment 4

Handover Message Format

When Handover Request/Select messages are exchanged between devices supporting Wi-Fi and NFC, the Handover Request message may be exchanged in an NFC Data Exchange Format (NDEF). The Handover Request message is a message used for NFC connection. Since the present invention deals with a case where the devices support WFDS, a Handover Request message reflecting this case is needed. Therefore the present invention proposes that a WFDS Information Record be included in the NDEF.

Figure 14:
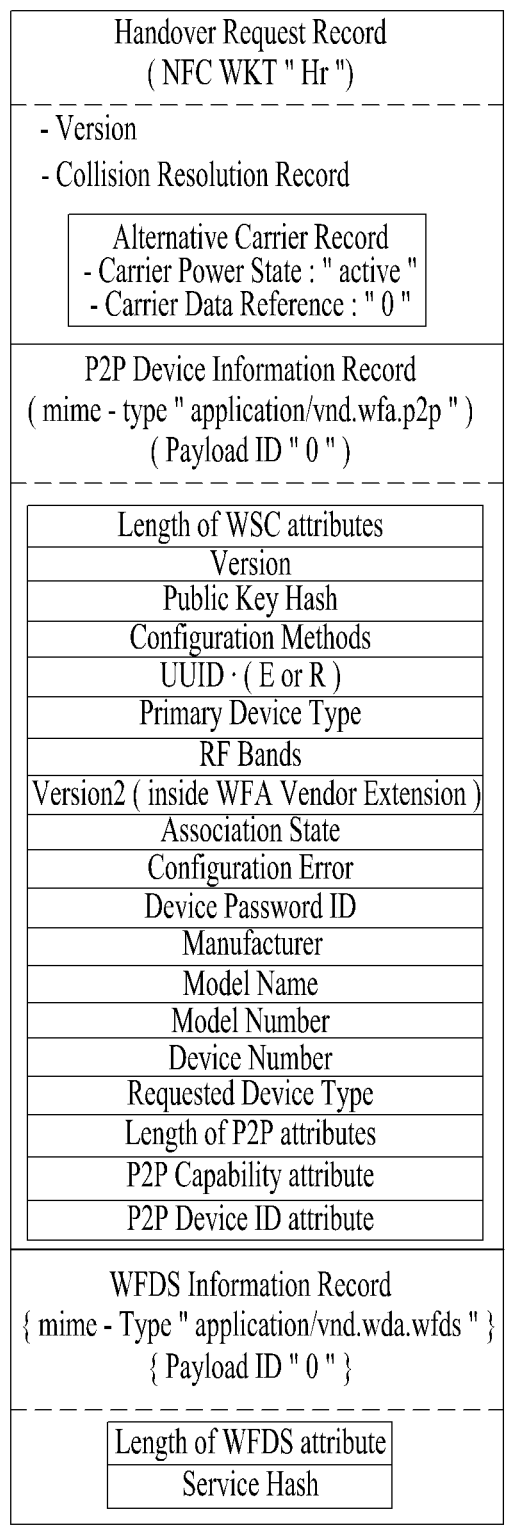
FIG. 14 is a diagram illustrating a handover request message according to one embodiment of the present invention.

FIG. 14 is a diagram illustrating a handover request message according to one embodiment of the present invention.

As shown in FIG. 14, a handover request message (record) may contain version information, collision resolution record, P2P device information record and WFDS information record. The Mime type may be defined as "application/vnd.wfa.wfds". An Attribute that needs to be essentially contained in the record is a service hash value. A 6-byte hash value may be generated by performing hashing on the service name. The service hash value is typically hashed as "org.wi-fi.wfds" to allow search for a certain WFDS service. In the Send service, for example, "org.wi-fi.wfds.send" may be searched for. A value generated by hashing "org.wi-fi.wfds.send.rx" may be a service hash value. In a special case, a plurality of hash values may be generated. Table 2 given below defines a service hash attribute contained in the handover request message.

TABLE 2

| Field | Size (in octets) | Value | Description |
|---|---|---|---|
| Attribute ID | 1 | 19 | This field confirms the type of the P2P attribute. |
| Length | 2 | 6 × N | This field indicates the field length of the attribute. N is the number of service hash fields N includes the service hash value. |
| Service Hash(s) | 6 × N | variable | Each service hash is a hash value of UTF-8 service name in 6 octets |

A service hash attribute includes an Attribute ID field, a Length field, and a Service Hash field. The Attribute ID field confirms the type of the P2P attribute. This field, whose size is 1 octet, has 19 values. The Length field indicates the field length of the attribute. This field, whose size is 2 octets, has a multiple of 6 as a value thereof. The multiplier N is the number of service hash fields. The Service Hash(s) field, which is a multiple of 6 octets in size, has a variable value. The Service Hash(s) field includes service hash values of the value N, and each service hash is a hash value of a UTF-8 service name in 6 octets.

Figure 15:
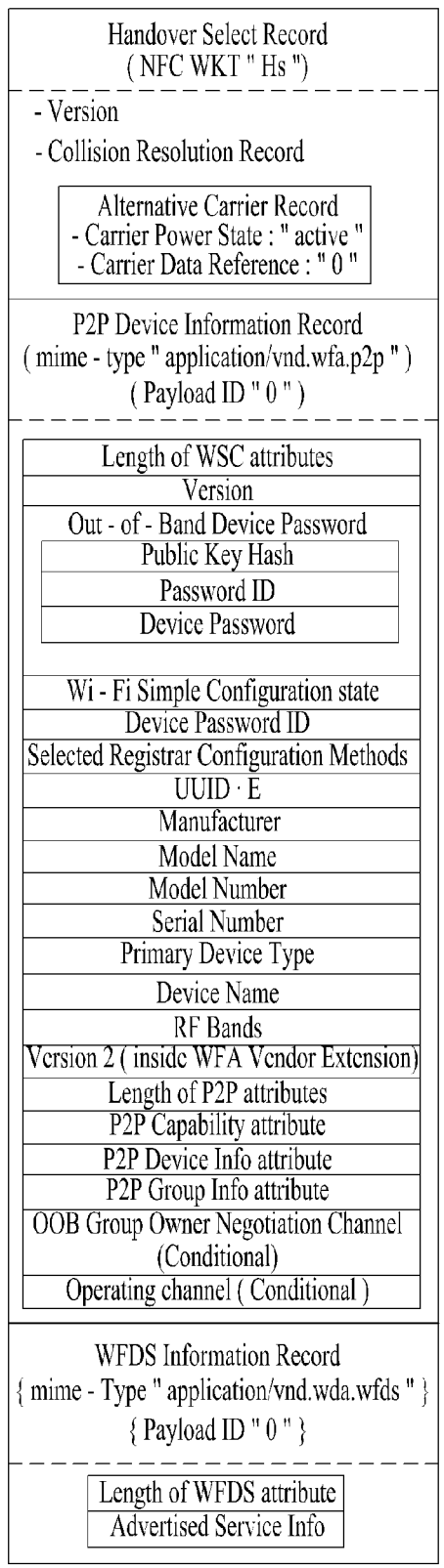
FIG. 15 is a diagram illustrating a Handover Select message according to one embodiment of the present invention.

FIG. 15 is a diagram illustrating a Handover Select message according to one embodiment of the present invention.

As shown in FIG. 15, a Handover Select message (record) may contain version information, collision resolution record, P2P device information record and WFDS information record. The Handover Select message may be used in Negotiation Handover and Static Handover in the same manner. An attribute that needs to be essentially contained in the record is advertise service information. The advertise service information may include an Advertised Service Descriptor containing the name of a specific service. The Advertised Service Descriptor may contain the length of a service name and a service name. Table 3 given below defines an advertisement ID information attribute, and Table 4 defines an advertised service information attribute.

TABLE 3

| Field | Size (in octets) | Value | Description |
|---|---|---|---|
| Attribute ID | 1 | 23 | This field confirms the type of the P2P attribute. |
| Length | 2 | Variable | Field length of the attribute |
| Advertised Service Descriptor | Sum of Advertised Descriptors | — | List of advertised service descriptors |

TABLE 4

| Field | Size (in octets) | Value | Description |
|---|---|---|---|
| Attribute ID | 4 | 0-ffffffff | Advertisement ID of a local service |
| Length | 1 | 0x00-0xff | Length of the service name |
| Advertised Service Descriptor | Variable | Variable | This field defines a service in a UTF-8 string. |

The advertisement ID information attribute includes an Attribute ID field, a Length field and an Advertised Service Descriptor(s) field. The Attribute ID field confirms the type of a P2P attribute. This field, whose size is 1 octet, has 23 values. The Length field indicates the field length of the attribute. This field, whose size is 2 octets, has a variable value. The Advertised Service Descriptor field indicates a sum of all advertised service descriptors in octets.

The advertised service information attribute includes an Advertisement ID field, Service Name Length field and a Service Name field. The Advertisement ID field indicates an advertisement ID of a local service. This field, whose size is 4 octets, has a value of 0-ffffffff. The Service Name Length field indicates the length of a service name. This field, whose size is 1 octet, has a value of 0x00-0xff. The Service Name field defines a service in a UTF-8 string, and the size and value thereof are variable.

Figure 16:
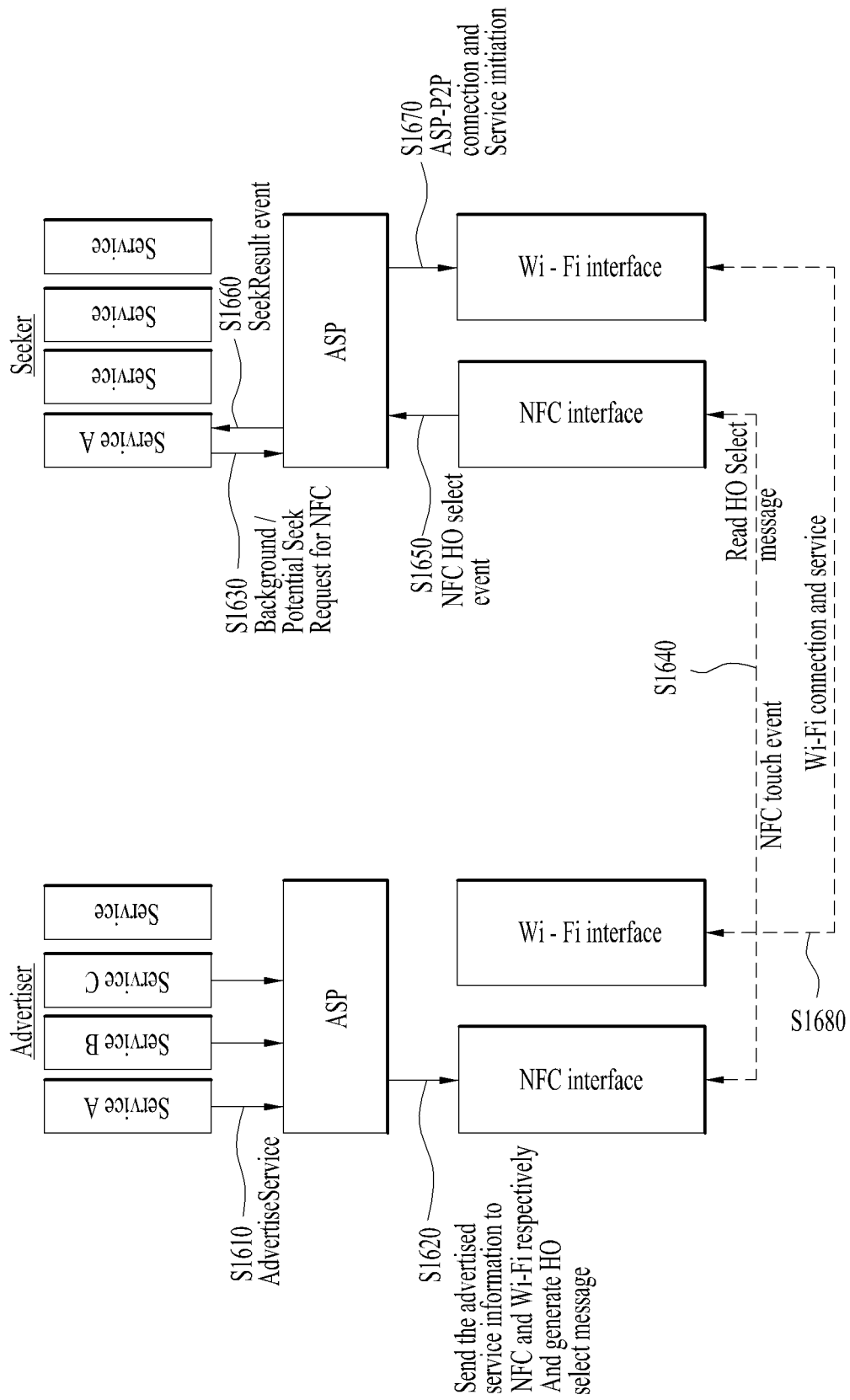
FIG. 16 is a diagram illustrating an example of the NFC handover procedure employed in the present invention.

FIG. 16 is a diagram illustrating an example of the NFC handover procedure employed in the present invention.

As shown in FIG. 16, the NFC handover procedure includes multiple steps to implement handover, which will be described individually. An overall process of the procedure will be described first. An advertiser device advertises a WFDS service which the device can provide on the ASP entity (S1610). The ASP entity transmits the advertised service to each of the NFC entity and the Wi-Fi entity (S1620). A seeker device also advertises a WFDS service which the device can provide (S1630). Thereafter, when NFC touch occurs (S1640), the seeker receives a Handover Select message from an NFC channel (interface), and the NFC module of the seeker device transmits an NFC Handover Select message to the ASP entity (S1650). The ASP entity of the seeker device seeks, for example, an existing advertised service and yields a seek result (S1660), and establishes connection and service with the advertiser device (S1680) via the Wi-Fi interface (S1670). Thereafter, each of the steps will be described in detail.

In step S1610, if a specific service is enabled, the advertiser advertises the service on the ASP entity using the AdvertiseService Method. If the advertiser device is enabled to perform service discovery and service initiation using NFC, the device may perform advertisement with NFC included in a parameter network_config in AdvertiseService. Herein, the advertised information may include a service name, an indication of auto accept, service availability, a role (group owner/group client) in a network group, network_config and deferred_session_response. If the advertiser supports multiple services (e.g., Play and Display) at the same time, the advertiser calls a plurality of AdvertiseService Methods, and each parameter value is generated by a higher service. The AdvertiseService Method function is given as follows.

AdvertiseService (service_name, auto_information, service_status, network_role, network_config, deferred_session_response)

In the function, network_config may be set to four values. Among the values, a first value may be Default Config or WSC PIN method without NFC, and a second value may be WSC PIN method only without NFC, which indicates that NFC is not supported. A third value may be Default Config or WSC PIN method with NFC, which indicates that NFC is applied, and a fourth value may be WSC PIN method only with NFC.

In step S1620, the ASP entity transmits the advertised service to the NFC and Wi-Fi entitys. If the device of the ASP supports device discovery/service discovery and provisioning through NFC and the parameter network_config in the advertised service is set to the third or fourth value, an additional operation may be performed for discovery through NFC. The ASP may transfer, to a lower NFC interface, information to be included in NFC Data Exchange Format (NDEF) data record such that the NFC interface generates and responds with a Handover Select message.

Advertised service information on one higher service may be described in the Handover Select message with one NFC alternative carrier (AC). If the device advertises a plurality of services, each service may have multiple ACs. Hereinafter, service information contained in the NDEF will be described. If a plurality of Wi-Fi interfaces for a MAC address is given, service_mac_address may be included in the service information. Service_mac_address indicates a MAC address of the advertiser device by which the advertiser device can actually support a service. Device_name indicates a device name familiar to the user. Advertisement ID indicates a unique ID of the advertised service which is generated when the service calls the AdvertiseService method from the first ASP. Service_name indicates a full service name of a service that calls the AdvertiseService method and may be expressed in the form of reverse DNS. Service Status is information indicating availability of a current service.

Figure 17:
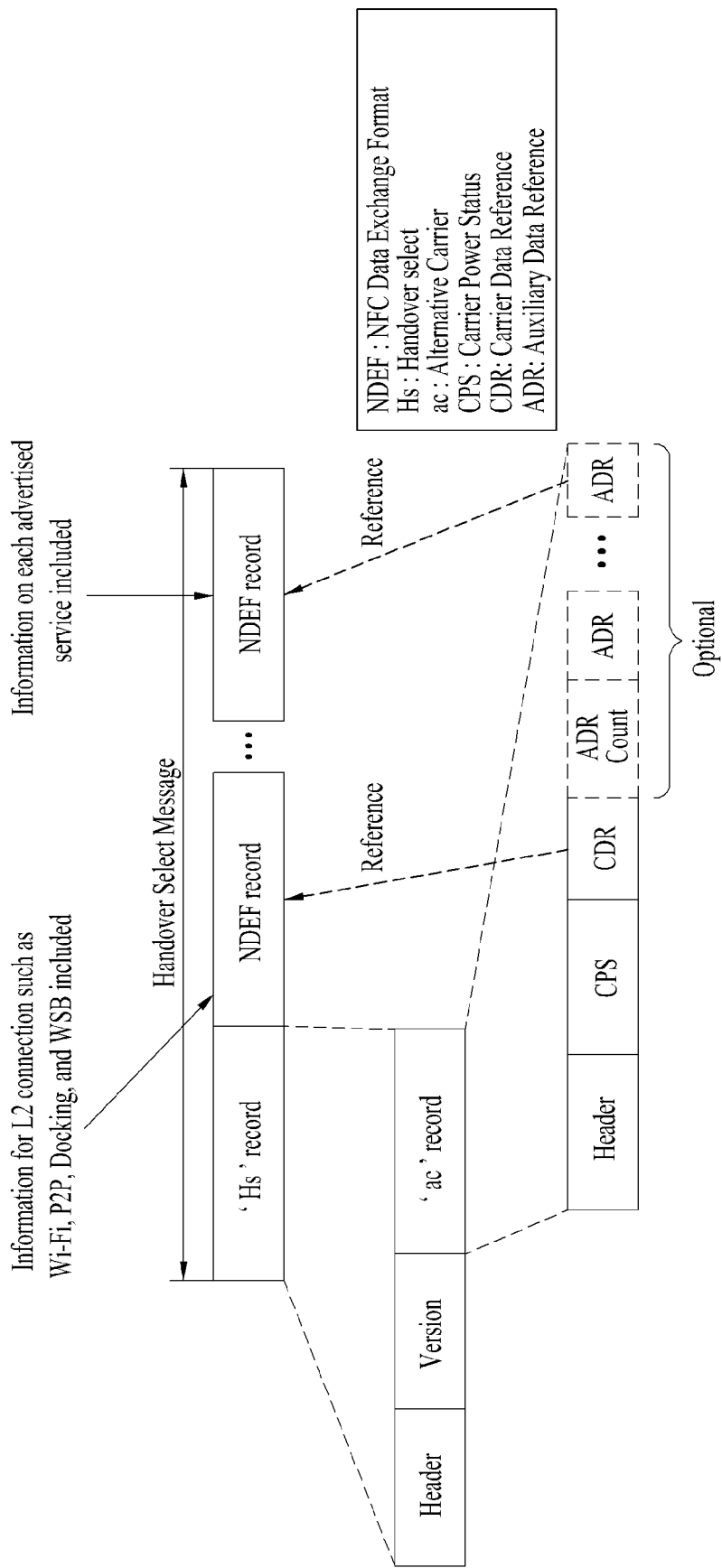
FIG. 17 is a diagram illustrating configuration of a Handover Select message according to one embodiment of the present invention.

FIG. 17 is a diagram illustrating configuration of a Handover Select message according to one embodiment of the present invention.

After receiving information from a higher ASP in step S1620, the NFC interface generates a message as shown in FIG. 17. One NDEF record represents one higher connection setup (e.g., Wi-Fi, P2P, Bluetooth, etc.), and information on a higher service may be defined in an auxiliary data record format. If a second layer connection is not given, a Carrier configuration for Wi-Fi should be included for WFDS next version and WFA program.

As shown in FIG. 17, the Handover Select record may be located at the front part of the Handover Select message. The Handover Select record may include Header, Version and 'ac' record. One ac record may include Header, CPS (Carrier Power Status), CDR (Carrier Data Reference), and optionally ADR (Auxiliary Data Reference) Count and ADR. The first NDEF record that comes after the Handover Select record includes information for second layer connection such as Wi-Fi, P2P, Docking and WSB. The second NDEF record and records after the second NDEF record may respectively include information about a service advertised by the advertiser.

Figure 18:
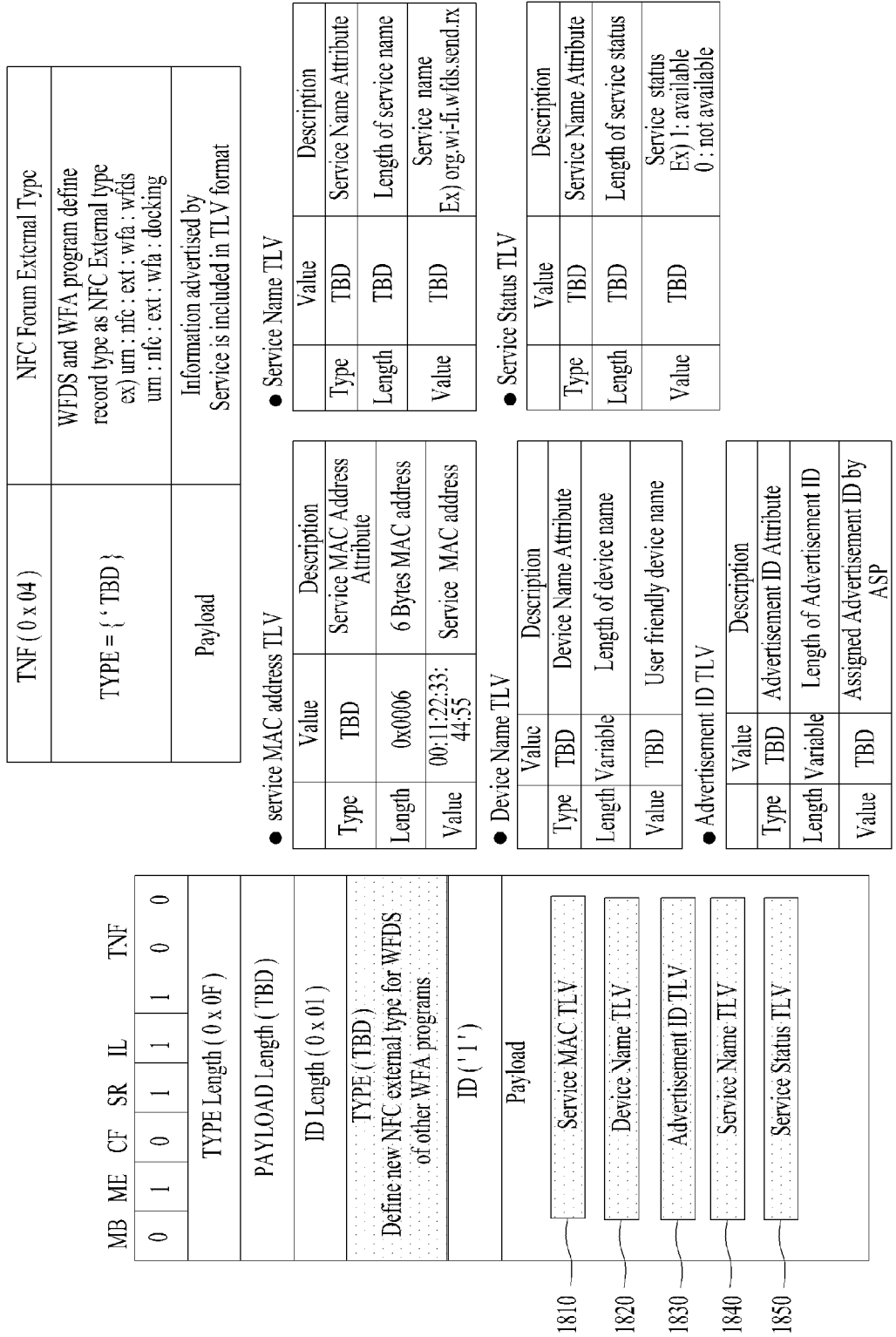
FIG. 18 is a diagram illustrating one NDEF record.

FIG. 18 is a diagram illustrating one NDEF record.

As shown in FIG. 18, one NDEF record may include service information in the payload part. The payload part may include service MAC, device name, Advertisement ID, service name and service status all in the format of Type-Length-Value (TLV). The seeker device may acquire information about a service which the advertiser is enabled to provide from the payload in the Handover Select message.

In step S1630, a Method indicating that the seeker device will seek a counterpart device when the service or application is executed is transferred to the ASP entity. As described above, in view of the devices, which do not know when NFC touch will occur, SeekService is performed first, compared to the existing WFDS. For example, when a Gallery application is executed on a smartphone, an image or video may be sent, played, or transmitted to an external display and displayed on the external display. Accordingly, when the Gallery application is executed, the ASP entity may be informed of a potential service capable of seeking, through NFC, a device enabled to receive the Send service. Thereafter, when NFC touch occurs, the ASP checks whether or not the potential service is matched. If the potential service is matched, the ASP calls the Method of PotentialSeekService given below.

PotentialSeekService(service_name, exact_search, service_information_request)

Hereinafter, configuration of the PotentialSeekService method will be described. Service_name indicates the name of a service that is sought. For example, "org.wi-fi.wfds-.send.rx" may be indicated in service_name. Exact_search indicates whether the search is the exact search defined in WFDS or prefix search. For example, if "org.wi-fi.wfds" is set to prefix search, all services of WFDS will be searched for. If "org.wi-fi.wfds" is set to "org.wi-fi.docking", a dockee and docking control center defined in docking is searched for. Unless service_information_request is set to a Null value, WFDS service discovery using ANQP protocol needs to be performed. If service_information_request is set to a specific value, specific information to be contained in a Service Discovery Request/Response message may be included.

Step S1640 is performed when NFC touch occurs. If both the advertiser device and the seeker device support NFC, the seeker device may acquire data in the NDEF format through NFC touch. As the NFC forum defines negotiation handover and static handover, both cases may be applicable.

If the seeker device receives a Handover Select message which the advertiser has pre-generated, the seeker device may acquire carrier configuration information and auxiliary data contained in the Handover Select message. The carrier configuration information is information about a carrier (e.g., Wi-Fi, Wi-Fi Direct, Bluetooth, etc.) to be connected through connection handover. The auxiliary data may include information on a higher service name advertised by the advertiser device, a service MAC address, a device name, service availability, and the like. The NFC interface may inform the ASP entity of occurrence of NFC touch by parsing or including the aforementioned information.

In step S1650, the Handover Select message is transmitted to the ASP entity. If PotentialSeekService which has been potentially sought before is not present, the ASP entity of the seeker may ignore the Handover Select event. If there is a Background/Potential Seek request, the NFC interface determines whether the parsed seek result matches PotentialSeekService. If a service is discovered through matching, the NFC interface announces the seek result to the higher Service entity. In this case, the ASP may prepare to announce the Auxiliary Data (information on the service) in the NDEF to the higher Service entity as a seek result, and have the carrier configuration information as connection information on connection for implementation of the service.

In steps S1660 and S1670, connection to the Wi-Fi interface is established through the search result, and the service is initiated. Service discovery may be performed through the NFC interface, which may be identical to the method defined in the WFDS standard through the Wi-Fi interface. Upon receiving the search result, the higher Service entity may deliver a ConnectSessions method to the ASP entity to initiate the service. Parameters included in the ConnectSessions method include service_mac and advertisement_id, which are set to values contained in the search result, and session_information and network_role, which are generated by the Service entity of the seeker. The ASP entity may perform ASP connection based on the cached carrier configuration information. If the carrier configuration includes Wi-Fi Direct information, ASP-P2P connection may be performed. If the carrier configuration does not include Wi-Fi information, the ASP entity may attempt to implement the service in the Wi-Fi AP mode.

Figure 19:
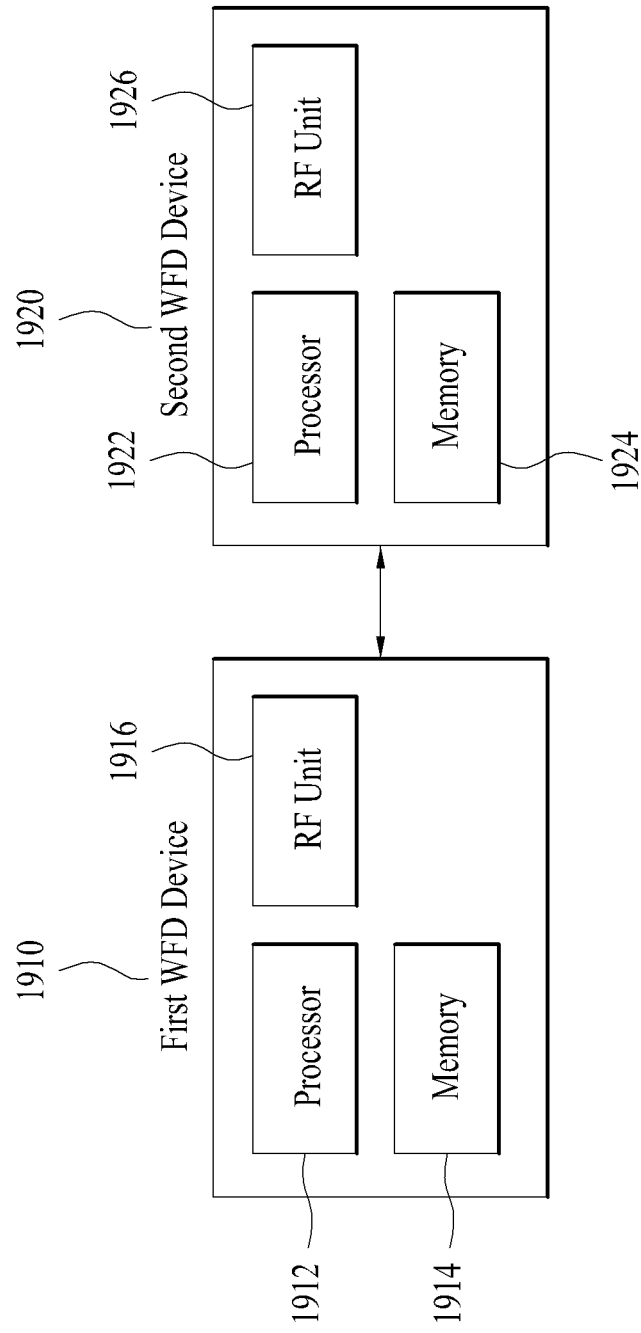
FIG. 19 is a diagram illustrating WFD P2P devices applicable to the present invention.

FIG. 19 is a diagram illustrating WFD P2P devices applicable to the present invention.

Referring to FIG. 19, a WFD network includes a first WFD device 1910 and a second WFD device 1920. The first WFD device 1910 includes a processor 1912, a memory 1914 and a radio frequency (RF) unit 1916. The processor 1912 may be configured to implement the proposed procedures and/or methods of the present invention. The memory 1914 is connected to the processor 1912 to store various kinds of information related to operations of the processor 1912. The RF unit 1916 is connected to the processor 1912 and configured to transmit and/or receive a radio signal. The second WFD device 1920 includes a processor 1922, a memory 1924 and an RF unit 1926. The processor 1922 may be configured to implement the proposed procedures and/or methods of the present invention. The memory 1924 is connected to the processor 1922 to store various kinds of information related to operations of the processor 1922. The RF unit 1926 is connected to the processor 1922 and configured to transmit and/or receive a radio signal. The first WFD device 1910 and/or the second WFD device 1920 may have a single antenna or multiple antennas.

In the embodiments described above, elements and features of the present invention are combined in a predetermined form. The elements or features should be considered optional unless explicitly mentioned otherwise. Each of the elements or features can be implemented without being combined with other elements or features. In addition, some elements and/or features may be combined to configure an embodiment of the present invention. The sequence of the operations discussed in the embodiments of the present invention may be changed. Some elements or features of one embodiment may also be included in another embodiment, or may be replaced with corresponding elements or features from another embodiment. It is apparent that some claims for which the relationship of dependency therebetween is not explicitly stated may be combined to configure an embodiment or may be incorporated into a new claim through amendment after filing of this application.

Embodiments of the present invention may be implemented by various means such as, for example, hardware, firmware, software, or a combination thereof. When implemented by hardware, one embodiment of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, one embodiment of the present invention may be embodied as a module, a procedure, or a function that performs the functions or operations described above. Software code may be stored in a memory unit and executed by a processor. The memory unit may be located at the interior or exterior of the processor to transmit and receive data to and from the processor via various known means.

It is apparent to those skilled in the art that the present invention may be carried out in other specific ways than those set forth herein without departing from the characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The present invention is applicable to direct device-to-device communication, specifically, to Wi-Fi Direct and a device for Wi-Fi Direct Services communication.

The invention claimed is:

1. A method for establishing Wi-Fi Direct Services (WFDS) communication by a first device having a processor and a transceiver, the method comprising:
   determining, by the first device, one or more potential services capable of being sought through a Near Field Communication (NFC) touch based on executing a service or an application by the first device, before the NFC touch occurs;
   receiving, by the first device, a handover select message from a second device via a NFC channel after the NFC touch occurs;
   determining, by the first device, whether the one or more potential services are matched to information parsed from the handover select message; and
   when there is a matched service between the one or more potential services and the information parsed from the handover select message, establishing, by the first device, a Wi-Fi interface with the second device and initiating the matched service with the second device,
   wherein the handover select message contains information indicating one or more services supportable by the second device.

2. The method of claim 1, wherein the handover select message contains service name information on the WFDS to be used by the second device.

3. The method of claim 1, wherein the handover select message contains configuration information allowing the first device to be discovered via a listen channel, the listen channel being used for WFDS connection.

4. The method of claim 1, further comprising:
   transmitting, by the first device, a Peer to Peer (P2P) service discovery request message to the second device; and
   receiving, by the first device, a P2P service discovery response message from the second device, the P2P service discovery response message being a response to the P2P service discovery request message.

5. A first device for establishing Wi-Fi Direct Services (WFDS) communication, the first device comprising:
   a transceiver; and
   a processor,
   wherein the processor determines one or more potential services capable of being sought through a Near Field Communication (NFC) touch based on executing a service or an application by the first device, before the NFC touch occurs, wherein the processor receives a handover select message from a second device via a NFC channel after the NFC touch occurs by controlling the transceiver, wherein the processor determines whether the one or more potential services are matched to information parsed from the handover select message, wherein when there is a matched service between the one or more potential services and the information parsed from the handover select message, the processor establishes Wi-Fi interface with the second device and initiating the matched service, and wherein the handover select message contains information indicating one or more services supportable by the second device.

\* \* \* \* \*